United States Patent
Yates et al.

(10) Patent No.: US 12,378,008 B2
(45) Date of Patent: Aug. 5, 2025

(54) SOLAR ARRAY SPRING ELEMENTS FOR STACKING SPACECRAFT

(71) Applicant: Maxar Space LLC, Westminster, CO (US)

(72) Inventors: Harry A. Yates, Mountain View, CA (US); Ryan Bieniek, Reno, NV (US); Alan J. Szeto, San Jose, CA (US); Kate Psyk, Tucson, AZ (US); Jonathan Briend, San Francisco, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 18/304,249

(22) Filed: Apr. 20, 2023

(65) Prior Publication Data

US 2024/0351711 A1 Oct. 24, 2024

(51) Int. Cl.
*B64G 1/44* (2006.01)
*B64G 1/10* (2006.01)

(52) U.S. Cl.
CPC .............. *B64G 1/443* (2013.01); *B64G 1/10* (2013.01)

(58) Field of Classification Search
CPC .. B64G 1/10; B64G 1/44; B64G 1/443; H02S 30/20
See application file for complete search history.

(56) References Cited

U.S. PATENT DOCUMENTS

| | | | | |
|---|---|---|---|---|
| 5,052,640 A * | 10/1991 | Chang | ............ | B64G 1/002 244/172.7 |
| 5,522,569 A | 6/1996 | Steffy et al. | | |
| 6,343,442 B1 * | 2/2002 | Marks | ............ | B64G 1/222 244/172.6 |
| 8,683,755 B1 * | 4/2014 | Spence | ............ | B64G 1/222 52/173.3 |
| 9,156,568 B1 | 10/2015 | Spence et al. | | |
| 9,580,190 B1 | 2/2017 | Spence et al. | | |
| 11,577,861 B1 | 2/2023 | Baghdasarian | | |
| 2018/0162561 A1 * | 6/2018 | Estevez | ............ | B64G 1/645 |
| 2018/0175785 A1 * | 6/2018 | Rakow | ............ | H02S 10/40 |
| 2018/0265227 A1 | 9/2018 | Cheynet et al. | | |
| 2020/0270001 A1 * | 8/2020 | Mansour | ............ | B64G 1/641 |
| 2023/0049753 A1 | 2/2023 | Freestone et al. | | |
| 2023/0050780 A1 | 2/2023 | Freestone et al. | | |
| 2023/0062667 A1 | 3/2023 | Baghdasarian | | |
| 2023/0064039 A1 | 3/2023 | Baghdasarian | | |

OTHER PUBLICATIONS

U.S. Appl. No. 17/554,000, filed Dec. 17, 2021.
U.S. Appl. No. 17/948,011, filed Sep. 19, 2022.
U.S. Appl. No. 63/341,353, filed May 12, 2022.
U.S. Appl. No. 17/952,050, filed Sep. 23, 2022.
U.S. Appl. No. 16/813,519, filed Mar. 9, 2020.
International Search Report & The Written Opinion of the International Searching Authority dated Aug. 12, 2024, International Application No. PCT/US2024/0213691.

* cited by examiner

*Primary Examiner* — Mayla Gonzalez Ramos
(74) *Attorney, Agent, or Firm* — Pearl Cohen Zedek Latzer Baratz LLP

(57) ABSTRACT

An example of an apparatus includes a spacecraft body and a solar array that is attached to the spacecraft body. In addition, a solar array spring element is configured to provide a force between the solar array and one or more components of a neighboring spacecraft in a stack of spacecraft.

20 Claims, 18 Drawing Sheets

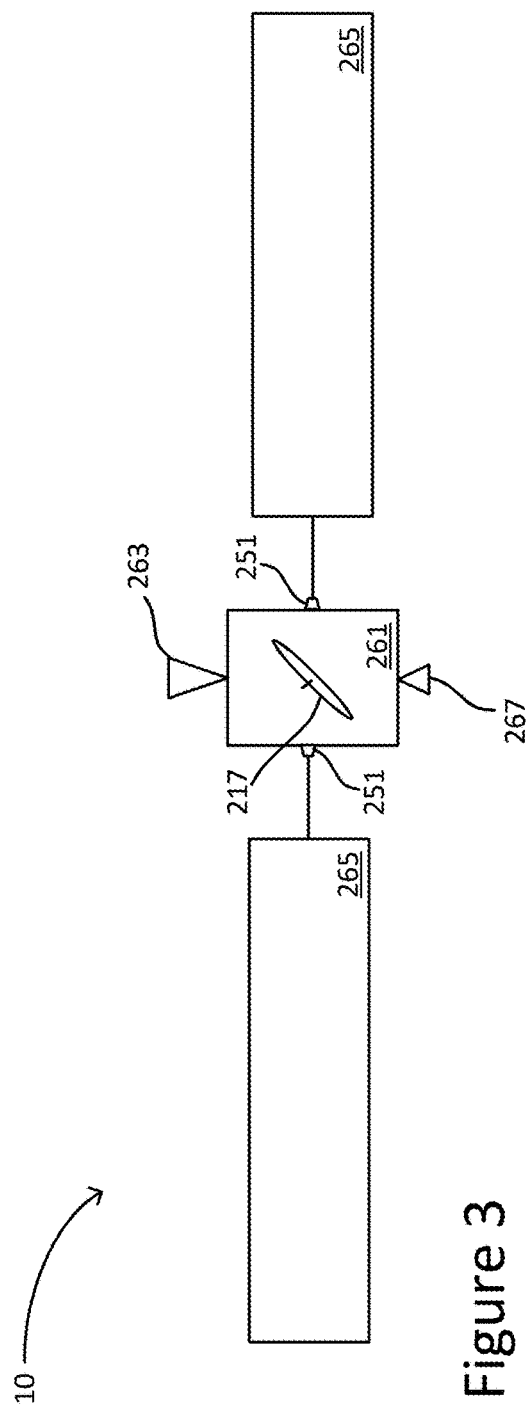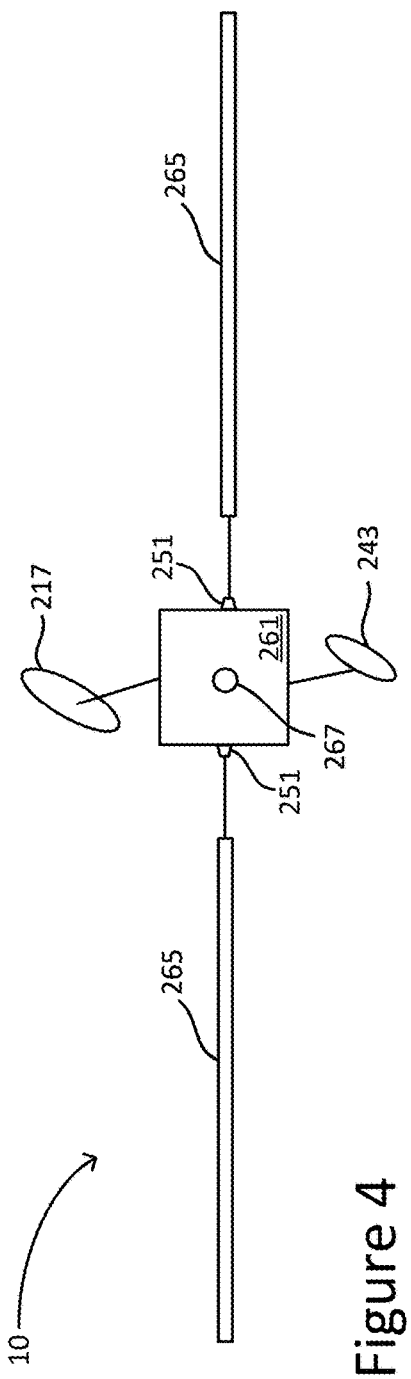

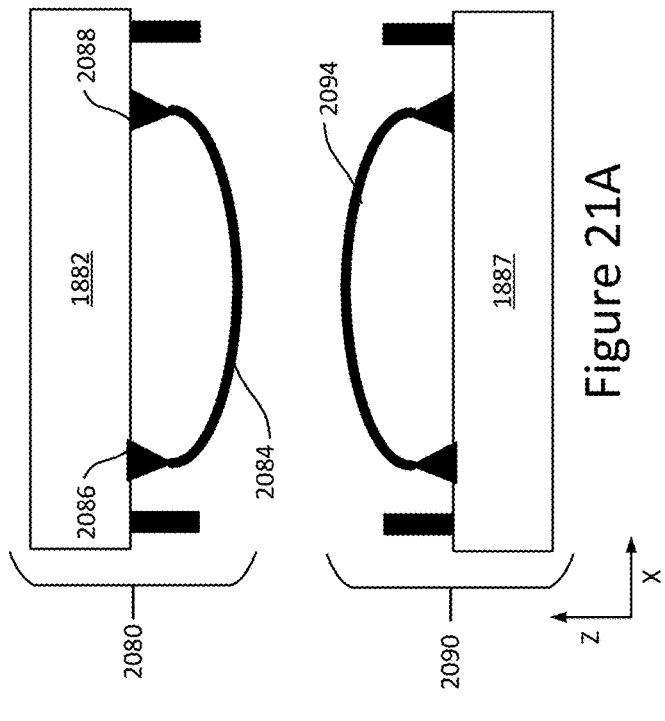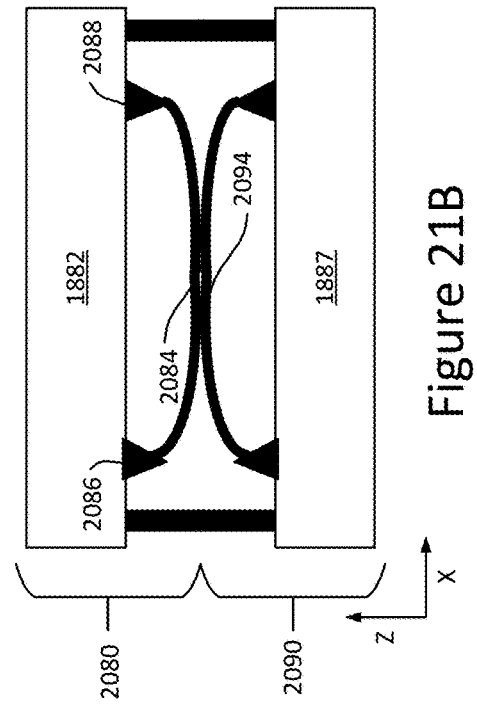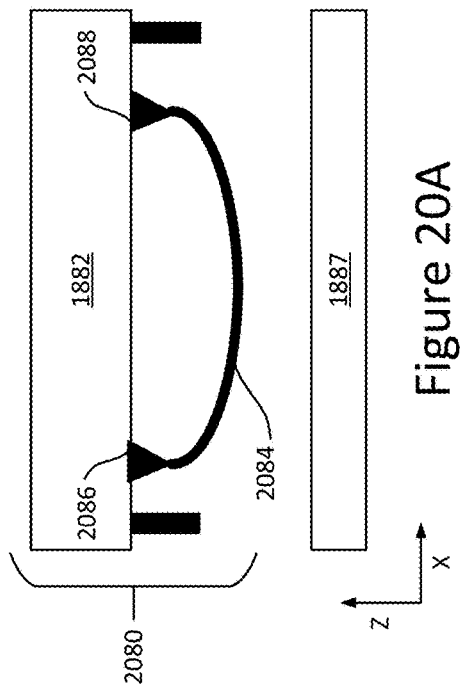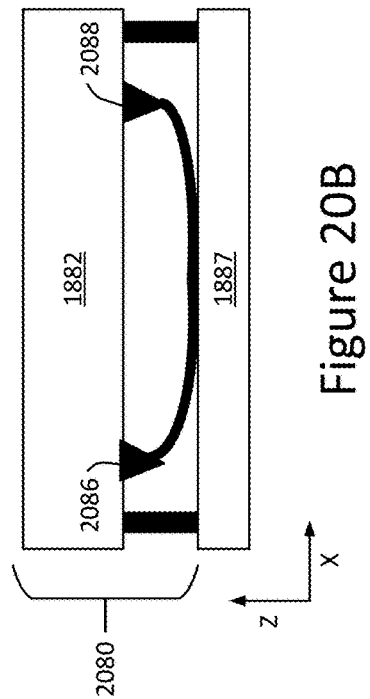

SOLAR ARRAY SPRING ELEMENTS FOR STACKING SPACECRAFT

BACKGROUND

To provide operating power, satellites use solar arrays with a large surface area of photovoltaic cells to generate electricity from the sunlight incident on the solar array. For shipment and launch the solar array may be stowed to have a small volume. In some cases, multiple spacecraft, each having one or more solar array wing, may be stacked in a launch vehicle. Spacecraft that include solar arrays must be strong enough to withstand significant forces that may occur during launch. Subsequent to launch, when the launch vehicle is in space, the launch vehicle may deploy spacecraft from the stack and each spacecraft may deploy its solar array(s). Designing solar arrays for stackable spacecraft to survive launch and subsequently be deployed efficiently while meeting other requirements (e.g., providing sufficient power and meeting weight restrictions) provides technological challenges.

BRIEF DESCRIPTION OF THE DRAWINGS

FIGS. 3 and 4 illustrate two views of a spacecraft with deployed solar arrays.

FIGS. 20A-B illustrate an example of tubes of a solar array frame used as spring elements.

FIGS. 21A-B illustrate an example of tubes of a solar array frame used as spring elements.

DETAILED DESCRIPTION

The following presents techniques for providing a solar array of a spacecraft (e.g., satellite) that is stacked with other spacecraft (e.g., in a launch vehicle) with one or more spring elements to provide support (e.g., during launch). In a solar array that is formed of tubes connected by nodes, spring elements may be located at nodes and may extend to contact a neighboring spacecraft in a stack to brace the solar array against the neighboring spacecraft (e.g., may be placed in compression to exert a force between the solar array and the neighboring spacecraft). Spring elements may also brace a solar array against the spacecraft body of the spacecraft to which it is attached. Solar array spring elements of spacecraft that are stacked (e.g., in a launch vehicle) may provide a load path to support solar arrays and spacecraft bodies during launch. Solar array spring elements may also provide force to assist deployment of spacecraft from a stack. In some examples, spring elements may be integrated with other components (e.g., in spring-loaded hinges). Where a solar array is formed of tubes connected by nodes, the tubes may be formed of a suitable material that allows them to be deflected so that they act as spring elements that are integrated into the frame.

Figure 1:
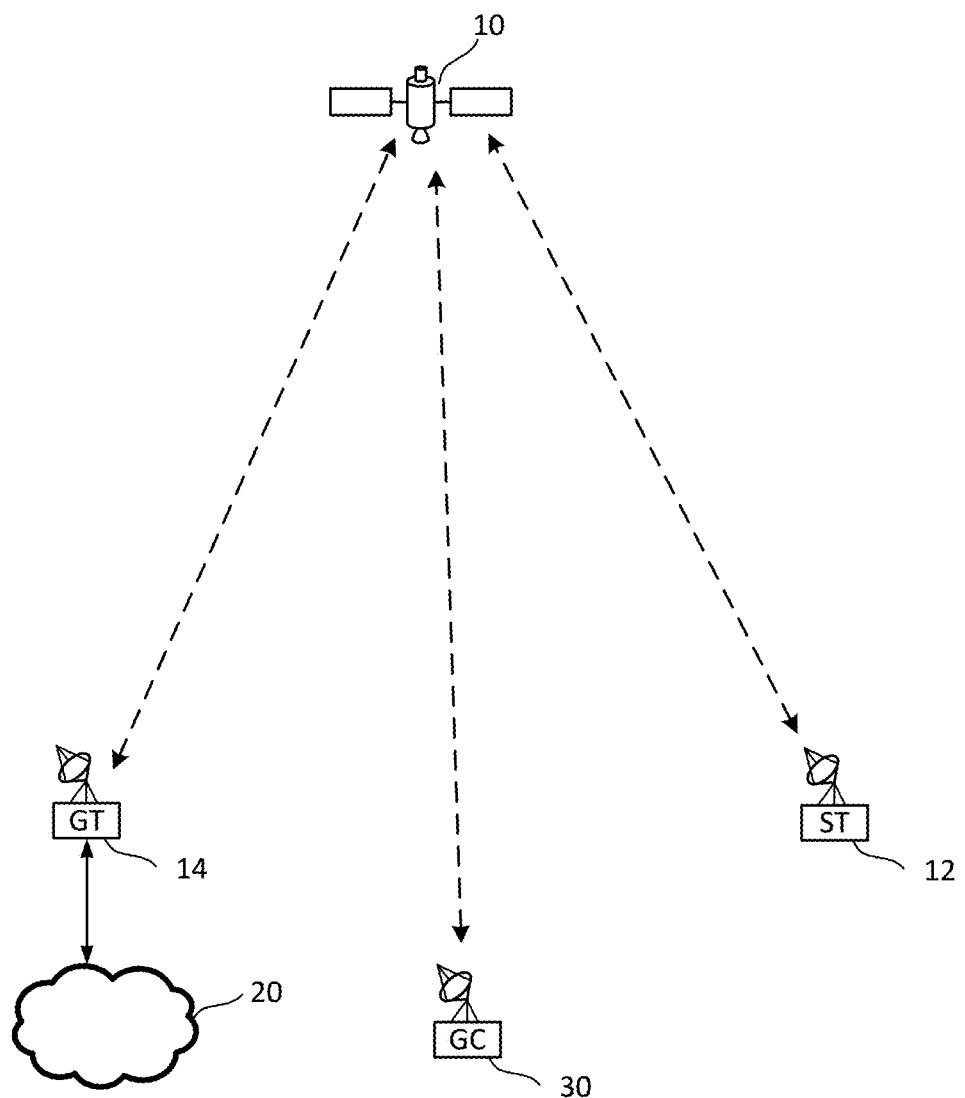
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway 14, and ground control terminal 30. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 14 and by at least one wireless user link to a plurality of subscriber terminals (e.g., subscriber terminal 12) via an antenna system. Gateway terminal 14 is connected to the Internet 20. The system allows spacecraft 10 to provide internet connectivity to a plurality of subscriber terminals (e.g., subscriber terminal 12) via gateway 14. Ground control terminal 30 is used to monitor and control operations of spacecraft 10. Spacecraft can vary greatly in size, structure, usage, and power requirements, but when reference is made to a specific embodiment for the spacecraft 10, the example of a communication satellite will often be used in the following, although the techniques are more widely applicable, including other or additional payloads such as for an optical satellite.

Figure 2:
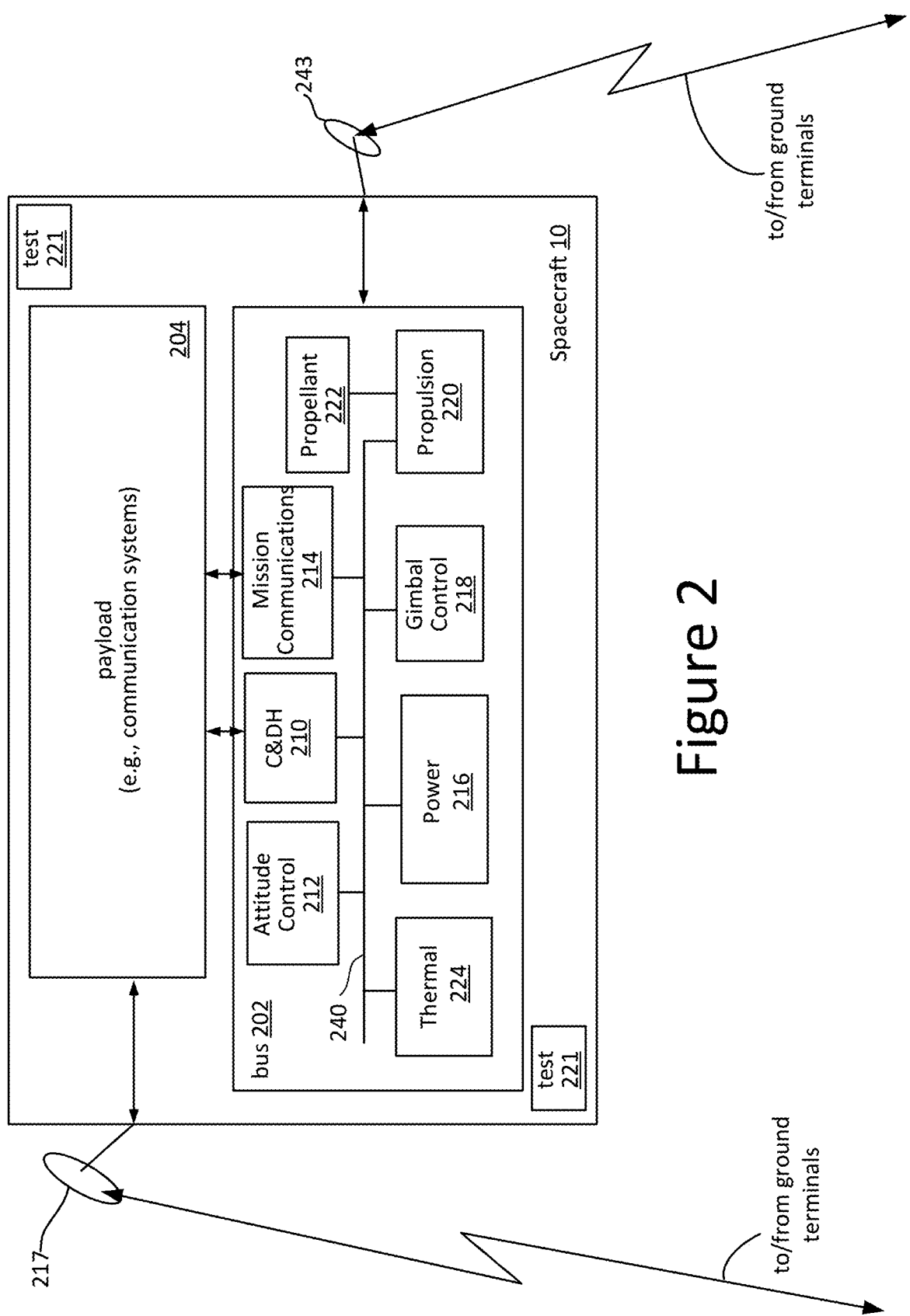
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload 204, such as the components for operation as a communication satellite. The bus 202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 210, attitude control systems 212, mission communication systems 214, power subsystems 216, gimbal control electronics 218 that be taken to include a solar array drive assembly, a propulsion system 220 (e.g., thrusters), propellant 222 to fuel some embodiments of propulsion system 220, and thermal control subsystem 224, all of which are connected by an internal communication network 240, which can be an electrical bus (a "flight harness") or other means for electronic, optical or RF communication when spacecraft is in operation. Also represented are an antenna 243, that is one of one or more antennae used by the mission communication systems 214 for exchanging communications for operating of the spacecraft with ground terminals, and a payload antenna 217, that is one of one or more antennae used by the payload 204 for exchanging communications with ground terminals, such as the antennae used by a communication satellite embodiment. The spacecraft can also include a number of test sensors 221, such as accelerometers that can used when performing test operations on the spacecraft. Other equipment can also be included.

The command and data handling module 210 includes any processing unit or units for handling includes command control functions for spacecraft 10, such as for attitude control functionality and orbit control functionality. The attitude control systems 212 can include devices including torque rods, wheel drive electronics, and control momentum gyro control electronics, for example, that are used to monitor and control the attitude of the space craft. Mission communication systems 214 includes wireless communication and processing equipment for receiving telemetry data/commands, other commands from the ground control terminal 30 to the spacecraft and ranging to operate the spacecraft. Processing capability within the command and data handling module 210 is used to control and operate spacecraft 10. An operator on the ground can control spacecraft 10 by sending commands via ground control terminal 30 to mission communication systems 214 to be executed by processors within command and data handling module 210. In one embodiment, command and data handling module 210 and mission communication system 214 are in communication with payload 204. In some example implementations, bus 202 includes one or more antennae as indicated at 243 connected to mission communication system 214 for wirelessly communicating between ground control terminal 30 and mission communication system 214. Power subsystems 216 can include one or more solar panels and charge storage (e.g., one or more batteries) used to provide power to spacecraft 10. Propulsion system 220 (e.g., thrusters) is used for changing the position or orientation of spacecraft 10 while in space to move into orbit, to change orbit or to move to a different location in space. The gimbal control electronics 218 can be used to move and align the antennae, solar panels, and other external extensions of the spacecraft 10.

In one embodiment, the payload 204 is for a communication satellite and includes an antenna system (represented by the antenna 217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 214 acts as an interface that uses the antennae of payload 204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

FIGS. 3 and 4 show an exterior view for an embodiment of spacecraft 10 in more detail. More specifically, FIGS. 3 and 4 show two views of an embodiment of spacecraft 10, where FIG. 4 shows the spacecraft rotated by 90° about the axis of the solar arrays 265 relative to FIG. 3. A number of different embodiments are possible, but the example of FIGS. 3 and 4 can be used to illustrate some of the elements relevant to the current discussion.

Referring to FIGS. 3 and 4, the spacecraft 10 includes a spacecraft body 261 from which extend two, in this example, deployed solar arrays 265. Attached to the body will also be one or more number of antennae 217 and 243 as described above, by which the satellite can receive and transmit signals. Depending on the particulars of the embodiment, a satellite may have a large number of antennae, but only a pair of antennae for exchanging signals with a ground station are shown. Attached to the spacecraft body 261 are a number of thrusters, as shown at 263 and 267, which typically include one or more main thrusters and a number of attitude and orbit control thrusters. Internal to the body will be the spacecraft's frame (not show) within which the functional sub-systems can be installed.

The deployed arrays 265 can include a solar array, a thermal radiating array, or both and include one or more respectively coplanar panels. The deployed arrays 265 can be rotatable by the gimbal control or solar array drive assembly 251 about the longitudinal axis (the left-right axis in FIGS. 3 and 4), as well as in other axes, in order to achieve or maintain a desired attitude with respect to, for example, the sun. For embodiments in which the deployed arrays 265 include a solar array, the solar array may be articulable so as to be substantially sun facing and electrically connected to the spacecraft 10 to provide power. The deployed solar array 265 may be sized and positioned so as to generate substantially more power from sunlight than would be possible if the solar array were fixedly disposed on the body 261 of the spacecraft 10. For example, in some implementations, the solar array orientation may be rotatable about the longitudinal axis of the spacecraft 10 so that photovoltaic power generating surfaces of the solar array remains substantially sun facing.

The solar array or arrays 265 of the spacecraft 10 have to meet a number of requirements. When in the deployed configuration, they need to be stable and meet the energy needs of the spacecraft. When in a stowed configuration, a solar array 265 needs to form a compact package that can fit within or largely within the outline of a side or sides of the body 261 of the spacecraft 10. Additionally, the mass of the array 265 should be as low as practical. As satellites and other spacecraft vary widely in shape, size, and power requirements, solar arrays are typically designed for a specific satellite or spacecraft design, so that for a different design or change in the specification of a current design requires a complete redesign of the solar array. This results in long lead times and high costs to design and build the arrays. To address these issues the following presents examples of a modular approach to solar arrays, allowing for arrays to be designed, and for the design to be modified, and manufactured in reduced time and with reduced cost.

More specifically, embodiments for a solar array are formed of multiple copies of a "bay" formed of a multiple strings of solar array cells mounted on semi-rigid face-sheet structural elements. For example, these bays can be of around a meter square. The bays are then placed into a frame structure made of tubes connected by nodes to provide an easily scalable, configurable, and producible solar array wing structure. This allows for rapid turnaround of program specific designs and proposal iterations that are quickly adaptable to new/future Photo Voltaic (PV) technologies and that can create uniquely shaped (i.e., not rectangular) arrays, allowing for mass production with simple mass producible building blocks.

Figure 5:
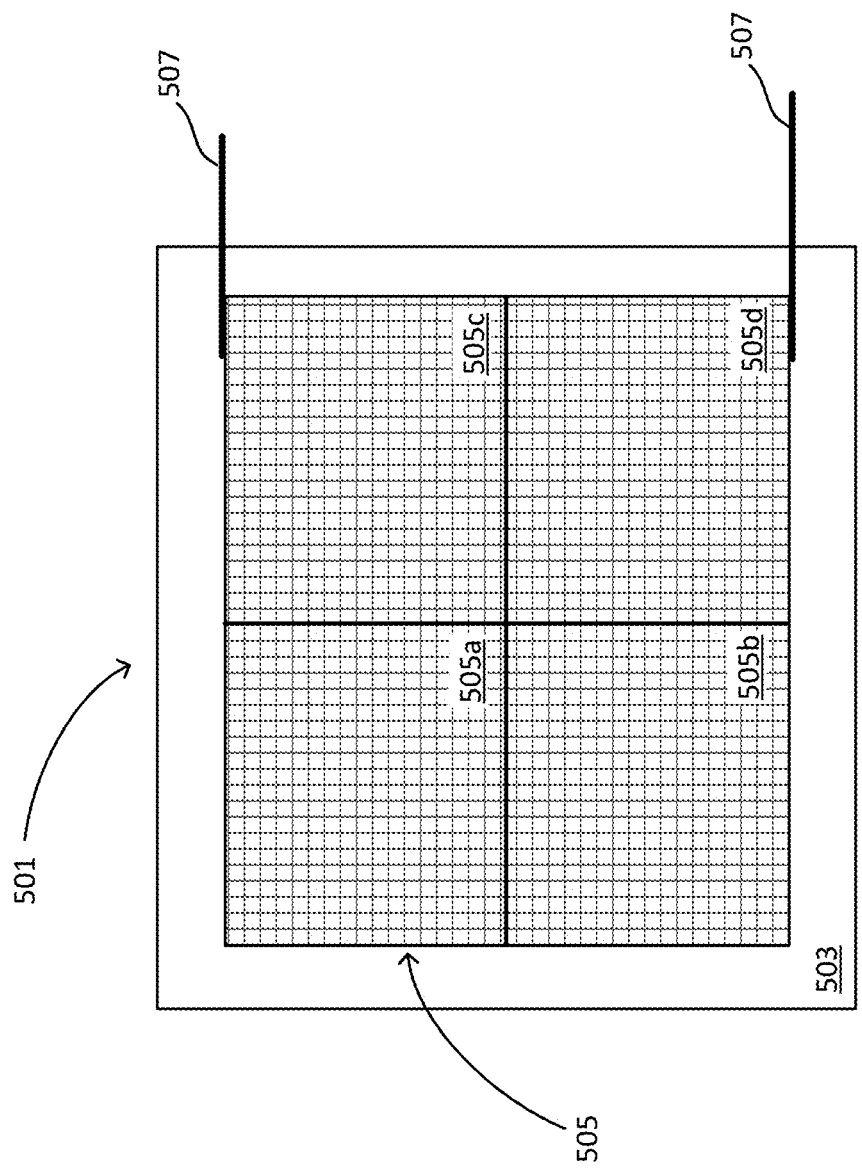
FIG. 5 illustrates an embodiment of a solar array building block element having an electrical element and a structural element.

FIG. 5 illustrates an embodiment of a solar array building block element having an electrical element and a structural element. The modular combined photovoltaic assembly (PVA) and substrate element 501, or bay, of the embodiment of FIG. 5 includes an electrical element 505 made up of four solar power sub-modules 505a, 505b, 505c, and 505d. Each of the sub-modules 505a, 505b, 505c, and 505d can formed of a number of standardized strings of series connected photovoltaic cells. The electrical element 505 is mounted on a structural element 503 of a semi-rigid composite face-sheet, such as a composite laminate, such as Kevlar, or similar non-conductive material. In some embodiments the structural element 503 can be coated with a material to reduce electrostatic discharge (ESD), such as black Kapton, and material for atomic oxygen (ATOX) protection, such as CV-1144-0. In one example, the bay 501 can be ½ to 1 meter on each side and provide, for example, 120-240 watts at 30 volts, depending on the PV technology used. A set of leads 507 can connect to a wiring harness for the array.

Figure 6:
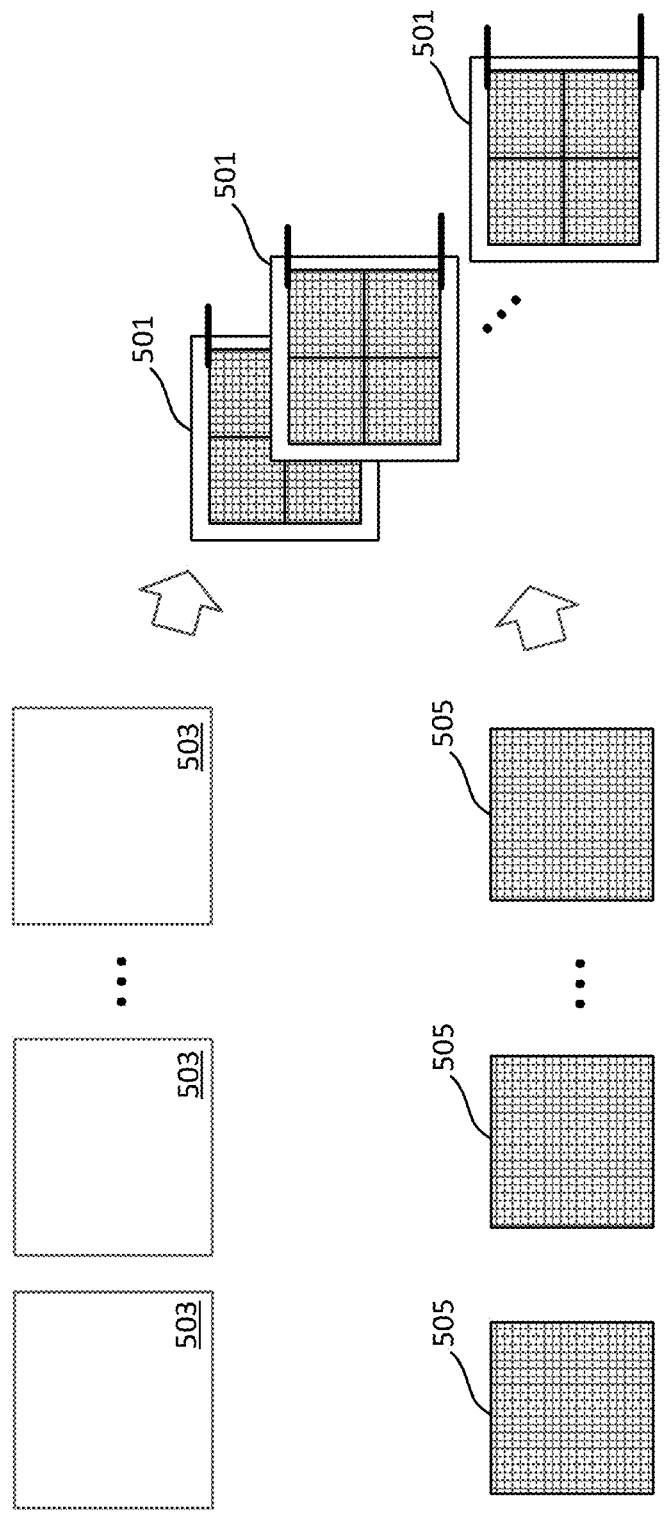
FIG. 6 illustrates the assembly of electrical elements and structural elements to form the bays of a solar array.

FIG. 6 illustrates the assembly of electrical elements 505 and structural elements 503 to form the bays 501. The semi-rigid face-sheets of structural elements 503 can be Kevlar, fiberglass, Astroquarz, or similar non-conductive material. The solar power modules of the electrical element 505 can be silicon, GaAs, or other photovoltaic cells bonded onto the structural elements 503 to form composite panels with flying leads. Multiple bays (e.g., bays 501) may be combined to form panels, which are combined to form a solar array. In some examples, the panels of a solar array are folded for launch and are subsequently unfolded (or deployed) when the spacecraft is in space.

Figure 7:
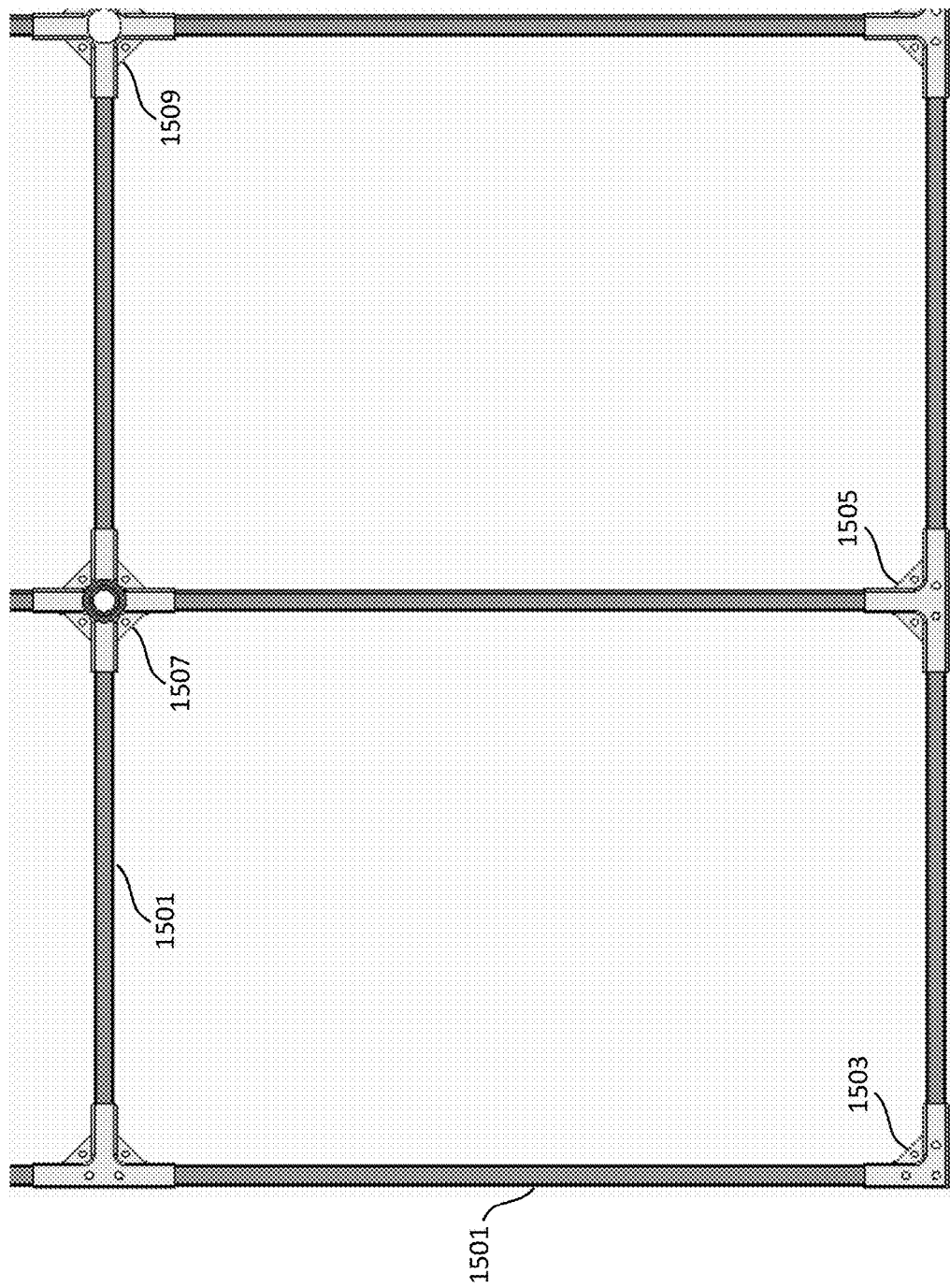
FIG. 7 illustrates an example of a portion of a solar array frame structure formed of tubes connected by nodes.

FIG. 7 illustrates an embodiment for the mechanical design of a frame structure that can be used in a modular structure for a solar array. A number of tubes 1501, such as of pultruded graphite, of the same cross-section can be made or ordered in bulk and cut to length and connected by nodes (1503, 1505, 1507, 1509), allowing sections to be readily added or removed if the requirements for the array change. More specifically, a number of tubes, two of which are marked out at 1501, connected by nodes similarly to the lugs of a lug and tube construction of a traditional bicycle frame. The tubes 1501 are assembled into a frame type of structure by corner nodes 1503, T-shaped end nodes 1505, center nodes 1509, and center nodes 1507 with a hold-down insert, where the nodes can have openings into which the tubes can be inserted. This allows a frame structure that is minimalist in a repeatable assembly procedure and allows for late stage design changes by adding or removing bays to the array. Depending on the embodiment, the nodes can be carbon-loaded polyether ether ketone (PEEK), injection molded, titanium (3D printed or machined), or titanium with stainless steel inserts, for example. Center nodes can either be fitted with a hold-down insert. 1507, another element such as a snubber, spring, or sensor; or left open. The size of the individual frames may be based on the size of the bays, as illustrated in FIG. 8.

Figure 8:
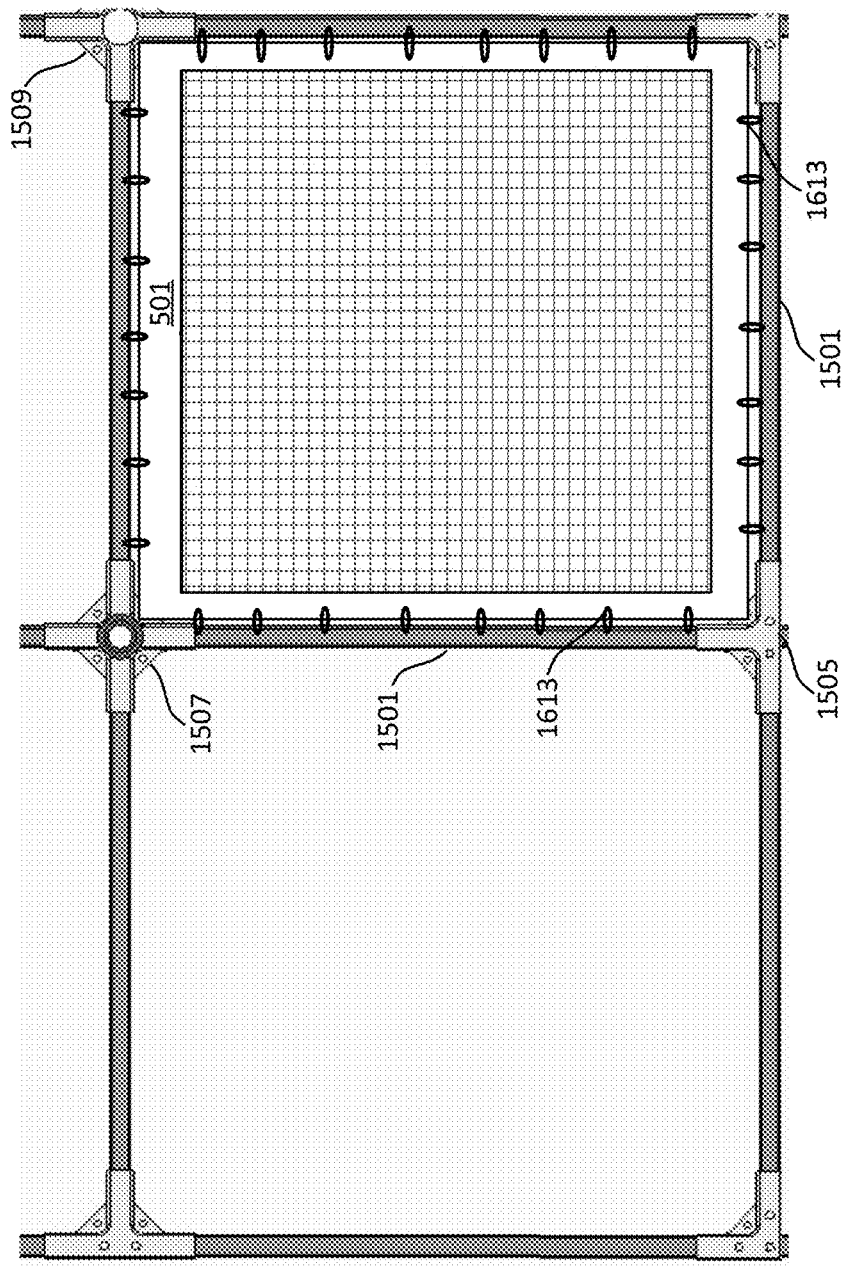
FIG. 8 illustrates an example of a bay attached to the frame of FIG. 7.

FIG. 8 repeats a portion of the frame structure with a bay attached in one of the frames. In the embodiment of FIG. 8, the bay 501 can be as described above and the tubes 1501 are sized to hold the bay 501 in frames as held together by the nodes 1503, 1505, 1507, and 1509, where the nodes selected for a given frame depends on its location within a multi-frame panel. The bay 501 can be held in place by fasteners 1613 connecting them to the tubes 1501 (frame members) and, in some embodiment, additionally or alternately to the nodes. A number of embodiments for the fasteners 1613 are possible, such as rivets, sewing of the bay to the frame, eyelets, straps, or various mechanical connectors. By using detachable connectors for the fasteners 1613, the individual bays 501 can be replaced if defective or for a different bay design (e.g., with an updated photovoltaic cell design), where the old bay can be detached mechanically and disconnected from the wiring harness and the replacement bay snapped back in its place. The replacement can be performed prior to launch or as part of an on-orbit servicing operation. This sort of modular structure of nodes connecting tubes to form frames that hold the bays also allows for rapid design changes as bays and frames can be added or removed by changing node types and adding or removing tubes and bays. Further examples of solar array structures and associated features are described in U.S. patent application Ser. No. 17/984,011, filed on Sep. 19, 2022, which is hereby incorporated by reference in its entirety.

Figure 9:
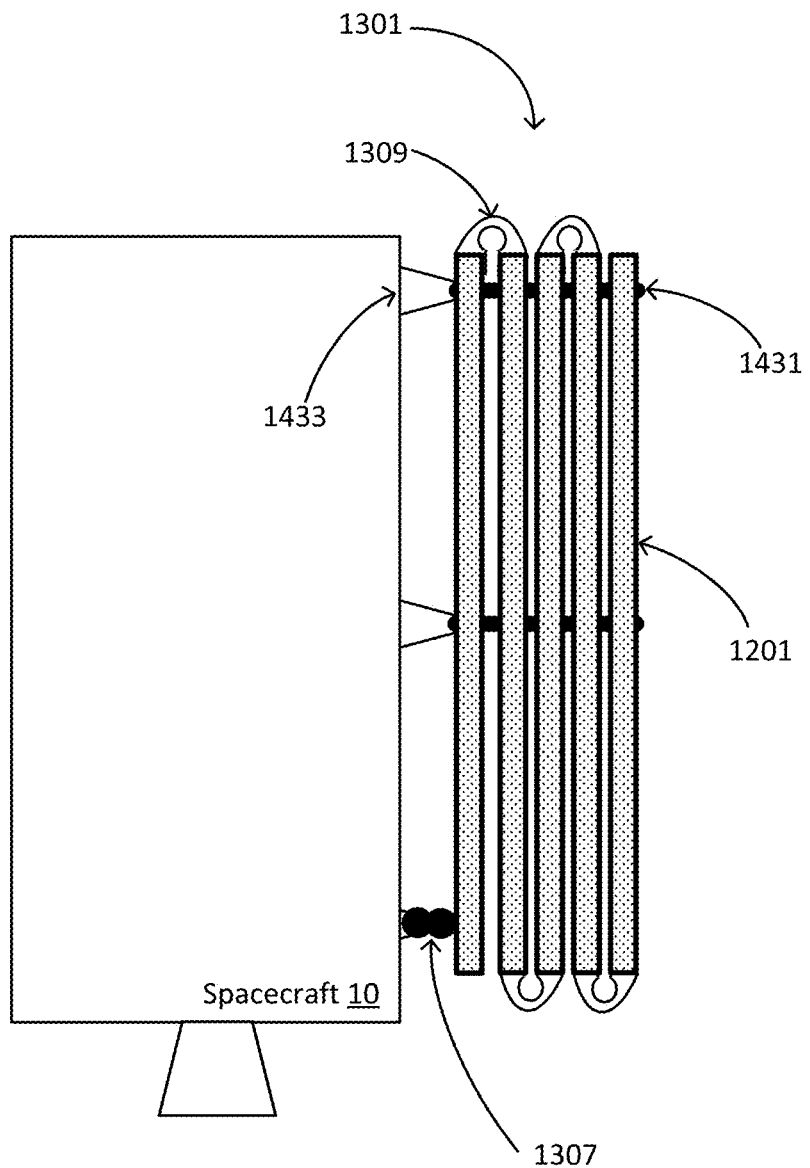
FIG. 9 illustrates an embodiment of a solar array in a stowed configuration.

FIG. 9 illustrates an embodiment of a solar array 1301 in a stowed configuration. Multi-bay panels 1201 are folded up into a stowed pack with the hinges 1309 flexed. In this embodiment, the panels 1201 are held in the stowed configuration on mounts 1433 by hold-downs 1431. Alternate embodiments can use snubbers rather than hold-downs. The yoke 1307 can fold up and attach at a solar array drive assembly on a mount on the body of the spacecraft 10.

FIG. 9 illustrates a particular example, but the techniques presented here can be applied to solar arrays with different number of panels, different numbers of bays within the panels, and also to more general shapes than the more traditional rectangular panels. For example, in some embodiments two or more panel/frame sizes (including different shapes) can be used, allowing for more general array shapes within the modular concept presented here. The embodiments provide an easily scalable, configurable, and producible array structure based on a "picture frame" structure that can be designed by automation and mass producible building blocks (pultrusions, injection mold, etc.). This allows for a rapid turn-around of program specific designs and proposal iterations and is compatible with any size solar array and technology, being quickly adaptable to new/future photovoltaic technology uniquely shaped (i.e., non-rectangular) arrays.

Figure 10A:
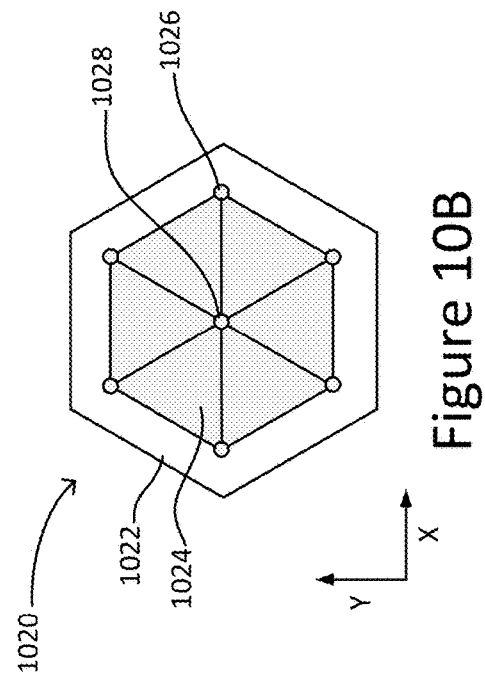
FIGS. 10A-B illustrate examples of spacecraft that each include a spacecraft body and a solar array attached to the spacecraft body.

A wide variety of solar array configurations are possible using a frame structure (e.g., frame structure made of a plurality of tubes connected by nodes as illustrated in FIGS. 7-8). FIG. 10A illustrates an example of a spacecraft 1000 that includes a spacecraft body 1002 and a solar array 1004 that has a frame structure (other components such as antennas, thrusters, etc. are omitted for clarity). Solar array 1004 extends over a central area of spacecraft body 1002, leaving peripheral areas uncovered in this view. Solar array 1004 is rectangular in shape with corner nodes (e.g., corner node 1006) each connecting two tubes, end nodes (e.g., end node 1008) each connecting three tubes, and a center node 1010 connecting four tubes. In other examples, there may be more nodes (e.g., more edge and center nodes).

Figure 10B:
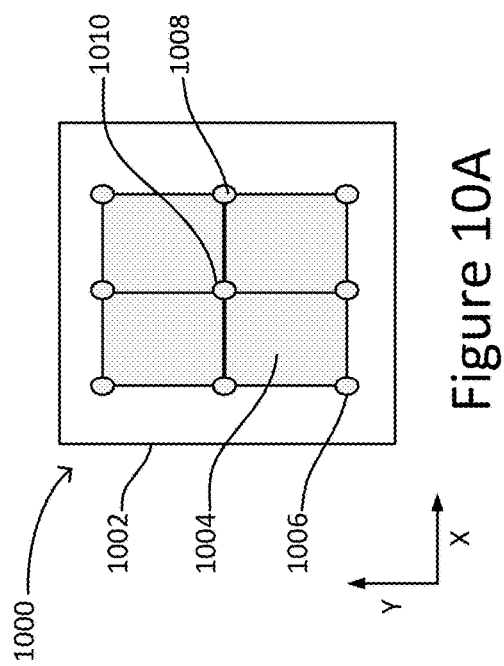

FIG. 10B illustrates an example of a spacecraft 1020 that includes a spacecraft body 1022 and a solar array 1024 that has a frame structure. Solar array 1024 is hexagonal in shape with corner nodes (e.g., corner node 1026) each connecting three tubes and a center node 1028 connecting six tubes. Solar array 1024 extends over a central area of spacecraft body 1022, leaving peripheral areas uncovered in this view.

While FIGS. 10A-B illustrate two configurations of solar arrays that have frame structures, additional configurations are possible including other polygon shapes (e.g., triangle, octagon, etc.) with different numbers of nodes, tubes and bays. While the examples of FIGS. 10A-B both show solar arrays that have similar shapes to their respective spacecraft bodies (e.g., spacecraft body 1002 and solar array 1004 are both rectangular while spacecraft body 1022 and solar array 1024 are both hexagonal), in some cases, these shapes may be different (e.g., octagonal solar array with a rectangular spacecraft body or triangular solar array with a square spacecraft body). Solar arrays 1004 and 1024 may be formed of multiple panels that are folded for launch or may be formed of a single panel. The present technology is not limited to a particular solar array shape or configuration (e.g., folding/non-folding), any number of panels, any spacecraft body shape or any number of bays.

A solar array that has a frame structure may be attached to a spacecraft body at one or more nodes. In general, nodes provide relatively strong points for attachment (e.g., of hinges and hold-downs). For example, a solar array may be attached to a spacecraft body by one or more hinge and by one or more hold-downs prior to launch. During deployment, the hold-down(s) may release and the hinge may open to allow the solar array to rotate into an operational configuration (additional hinges may open to deploy or unfold panels of the solar array into their operational configuration). Hinges and tie-downs are not shown in the views of FIGS. 10A-B (view is along the z-axis).

Figure 11A:
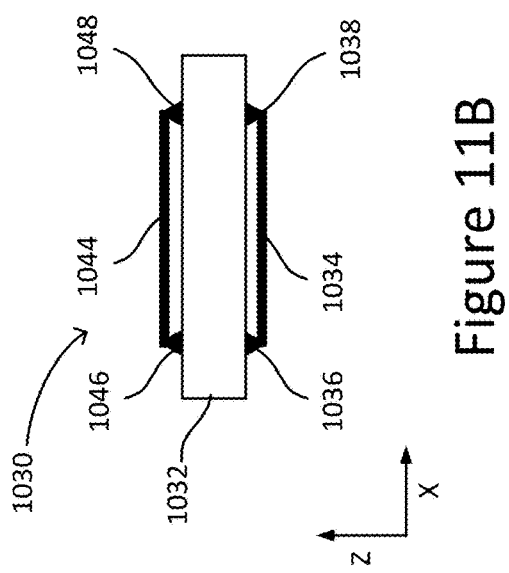
FIGS. 11A-B illustrate spacecraft with one and two solar array wings respectively.

FIG. 11A shows a view (along the y-axis) of an example spacecraft 1030 that includes a spacecraft body 1032, solar array 1034, a hinge 1036 and a hold-down 1038 (additional hinge(s) and hold-down(s) may be provided). Spacecraft body 1032 may have any shape in cross-section along the x-y plane (e.g., rectangular like spacecraft body 1002, hexagonal like spacecraft body 1022, or other shape) and solar array 1034 may have any shape in cross-section along the x-y plane (e.g., rectangular like solar array 1004, hexagonal like solar array 1024, or other shape).

Figure 11B:
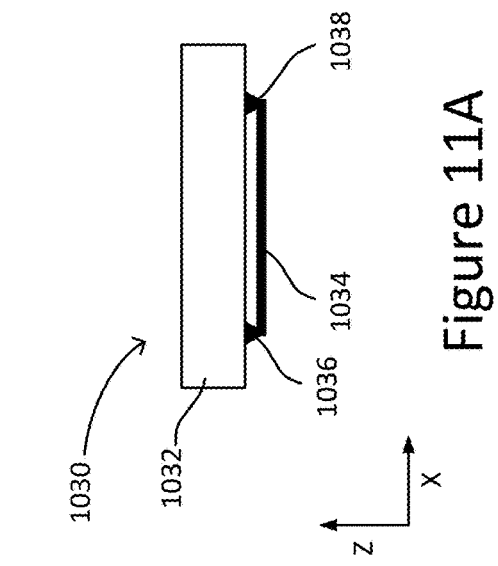

FIG. 11B shows a view (along the y-axis) of an example of spacecraft 1030 that includes a second solar array 1044 in addition to solar array 1034. Second solar array 1044 is attached to spacecraft body 1032 by a hinge 1046 and a hold-down 1048 (additional hinge(s) and hold-down(s) may be provided). Second solar array 1040 may be identical to solar array 1034 or may be different (e.g., different size, number of bays, number of panels, shape, orientation, or otherwise). In other examples, more than two solar arrays may be provided.

In some examples, spacecraft may be stacked in a launch vehicle for launch. For example, some satellite constellations may use large number of spacecraft (e.g., satellites for Low Earth Orbit "LEO" constellations), which may be efficiently launched in batches instead of individually. A stack of spacecraft may efficiently use space in a launch vehicle.

Figure 12:
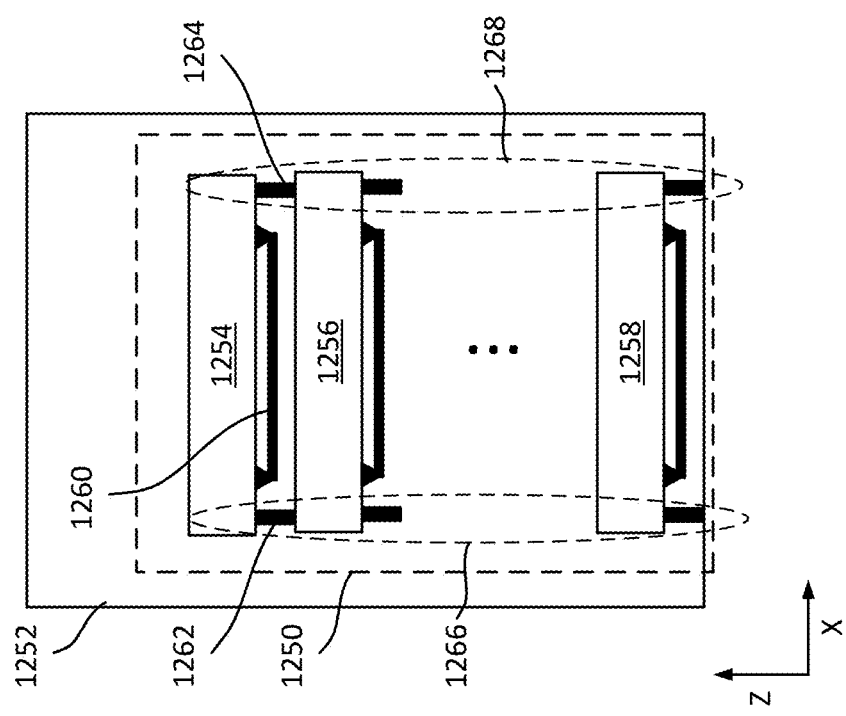
FIG. 12 illustrates an example of a stack of spacecraft each having one solar array.

FIG. 12 shows an example of a stack of spacecraft 1250 in a launch vehicle 1252. Stack 1250 extends along the z-direction (e.g., extending along a central axis in the z-direction). Spacecraft 1254, 1256 and 1258 are illustrated. Additional spacecraft (not shown) may also be provided in stack 1250. Spacecraft 1254, 1256 and 1258 may be similar to one or more spacecraft of previous examples (e.g., spacecraft 1030 configured with one solar array as illustrated in FIG. 11A). Each spacecraft in stack 1250 includes a solar array in a folded configuration for launch. Solar arrays are located between neighboring spacecraft, e.g., between a spacecraft body to which they are attached and its neighbor in stack 1250. For example, solar array 1260 is located between the body of spacecraft 1254 to which it is attached and neighboring spacecraft 1256. FIG. 12 also shows spacecraft in stack 1250 having load bearing structures that directly contact neighboring spacecraft in stack 1250 (e.g., load bearing structures 1262 and 1264 of spacecraft 1254, which make direct contact with neighboring spacecraft 1256). Load bearing structures may be dedicated structures that are designed to bear mechanical load during launch and/or may be integrated with other components (e.g., integrated with a spacecraft's frame or other spacecraft body component). Load bearing structures that are aligned in the z-direction form load paths that support spacecraft in stack 1250 during launch. For example, load paths 1266 and 1268 are formed in stack 1250 where load bearing structures of spacecraft align along the z-direction. The number and location of such load paths depends on the locations of load bearing structures, which are generally located in peripheral areas of the spacecraft (e.g., as illustrated with load paths 1266 and 1268) leaving central areas open for components such as solar arrays, antennas, etc.

Figure 13:
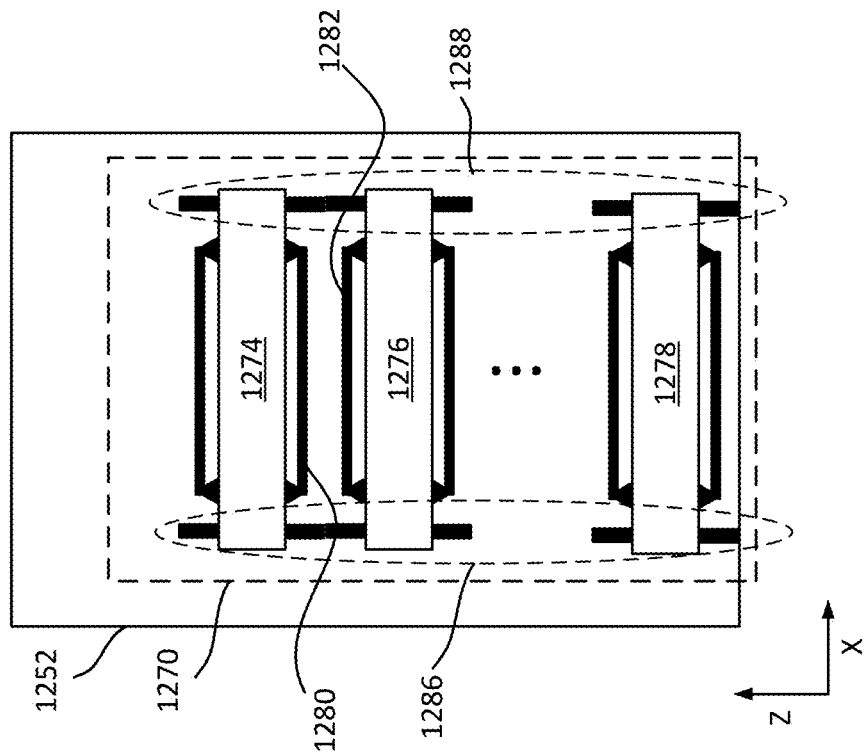
FIG. 13 illustrates an example of a stack of spacecraft each having two solar arrays.

FIG. 13 shows another example of a spacecraft stack 1270 in launch vehicle 1252. Spacecraft 1274, 1276 and 1278 are illustrated. Additional spacecraft (not shown) may also be provided in stack 1270. Spacecraft 1274, 1276 and 1278 may be similar to one or more spacecraft of previous examples (e.g., spacecraft 1030 configured with two solar arrays as illustrated in FIG. 11B). Each spacecraft in stack 1250 includes two solar arrays in a folded configuration for launch. Solar arrays are located between neighboring spacecraft, e.g., between a spacecraft body to which they are attached and a solar array of a neighboring spacecraft in stack 1270. For example, solar array 1280 is located between the body of spacecraft 1274 to which it is attached and solar array 1282 of neighboring spacecraft 1276. Load bearing structures form load paths 1286 and 1288 that support stack 1270.

In an alternative to the arrangements of FIGS. 13 and 14, spacecraft with one solar array (e.g., like spacecraft 1030 of FIG. 11A) may be stacked in an alternating arrangement so that solar arrays of neighboring spacecraft face each other (e.g., like solar arrays 1280 and 1282). The present technology is not limited to spacecraft having any particular number or configuration of solar arrays or spacecraft stacked in any particular arrangement.

During launch, a launch vehicle and its contents (e.g., spacecraft to be launched) may experience significant physical forces. Load paths in a stack of spacecraft may support spacecraft during launch. Solar arrays may be attached to spacecraft (e.g., by hinges and hold-downs) in a manner that provides sufficient support to enable solar arrays (which may be relatively fragile structures) to survive launch. However, in some cases, central areas of spacecraft (including spacecraft bodies and solar arrays) in a stack may experience significant bowing or "oil-canning" during launch, which may cause damage. It may be difficult to provide additional load paths in a central area of a stack of spacecraft because of the presence of components such as solar arrays and antennas.

Aspects of the present technology include solar array spring elements that provide a force between a solar array and a neighboring spacecraft in a stack of spacecraft. Such spring elements may provide support for solar arrays and/or spacecraft bodies in a stack and may form one or more load paths that extend through a central area of a stack of spacecraft. For solar arrays that have a frame structure (e.g., made of a plurality of tubes connected by nodes) spring elements may be located at nodes, which are generally structurally strong locations with capacity to take loads applied by spring elements.

Figure 14A:
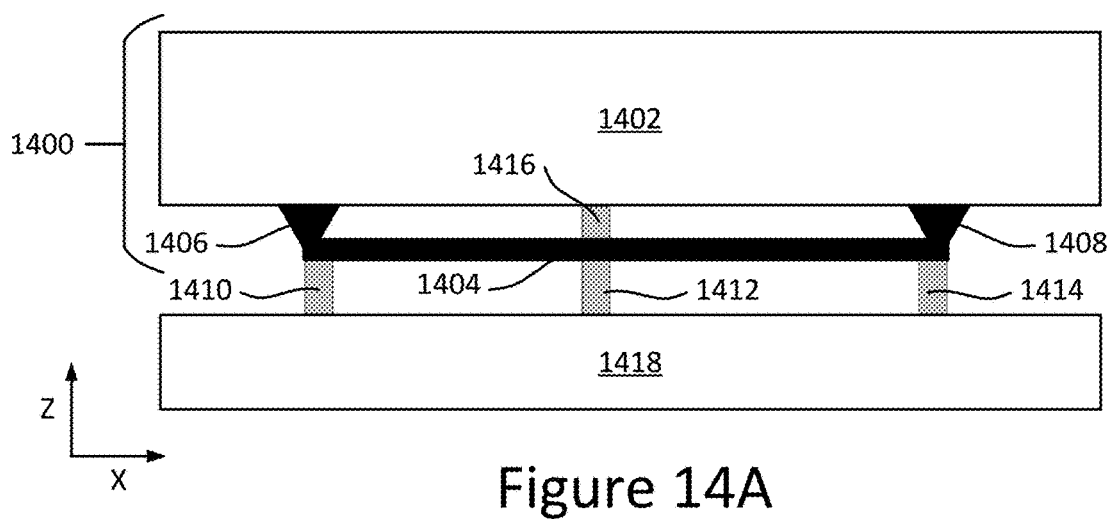
FIGS. 14A-B illustrate examples of solar array spring elements attached to solar arrays of a spacecraft.

FIG. 14A shows an example of a spacecraft 1400 (e.g., a spacecraft in stack 1250) that includes a spacecraft body 1402 and a solar array 1404, which is attached to spacecraft body 1402 by hinge 1406 and hold-down 1408. FIG. 14A also shows solar array spring elements 1410, 1412 and 1414 extending between solar array 1404 and spacecraft body 1418 of a neighboring spacecraft (load bearing structures are omitted for clarity). Additionally, spring element 1416 extends between solar array 1404 and spacecraft body 1402. Spring elements 1410, 1412, 1414 and 1416 may be located at nodes of a frame structure of solar array 1404. For example, spring element 1410 may be located at the same node (corner node or end node) as hinge 1406 or a different node along the same edge of solar array 1404, spring element 1414 may be located at the same node (corner node or end node) as hold-down 1408 or a different node along the same edge of solar array 1404 and spring elements 1412 and 1416 may be located at a central node. Spring elements 1410, 1412, 1414 and 1416 may have dimensions that cause them to be placed in compression as spacecraft 1400 is placed in a stack of spacecraft (e.g. in compression against spacecraft body 1418).

Figure 14B:
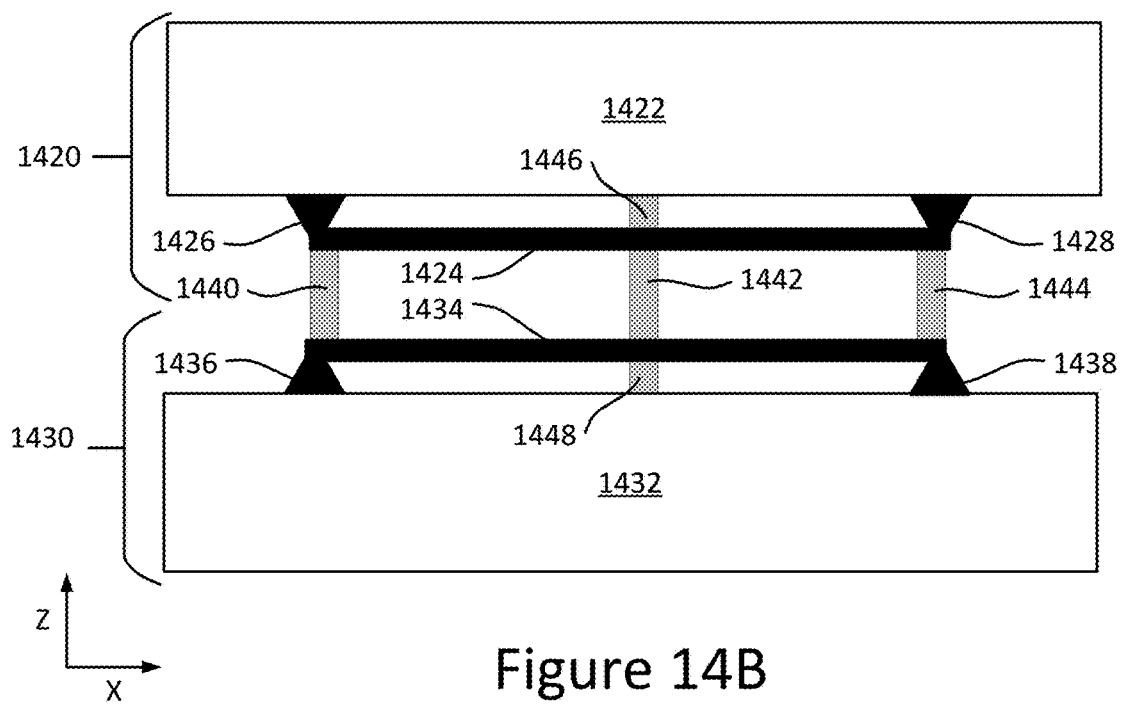

FIG. 14B shows an example of two spacecraft 1420 and 1430 (e.g., two spacecraft in stack 1270). Spacecraft 1420 includes a spacecraft body 1422 and a solar array 1424, which is attached to spacecraft body 1422 by hinge 1426 and hold-down 1428. Spacecraft 1430 includes a spacecraft body 1432 and a solar array 1434, which is attached to spacecraft body 1432 by hinge 1436 and hold-down 1438. FIG. 14B also shows solar array spring elements 1440, 1442 and 1444 extending between solar array 1424 and solar array 1434. Spring elements 1440, 1442 and 1444 may each be formed of a single spring element attached to one of the solar panels or may be formed of a combination of two spring elements each attached to a different solar array. Additionally, spring element 1446 extends between solar array 1424 and spacecraft body 1422 and spring element 1448 extends between solar array 1434 and spacecraft body 1432. Spring elements 1440, 1442, 1444, 1446 and 1448 may be located at nodes of a frame structure of solar arrays 1424 and 1434. Spacecraft may be stacked so that nodes of opposed solar arrays are aligned, e.g., spacecraft in the same orientation or rotated (clocked to have different rotational orientations) through an angle that aligns nodes with corresponding nodes. Spring elements 1440, 1442, 1444, 1446 and 1448 are placed in compression during placement in a stack of spacecraft in a launch vehicle.

The number and locations of spring elements may be selected according to the solar array design. The illustrations of FIGS. 14A-B are for illustration purposes and the present technology is not limited to any particular number or locations of spring elements.

Figure 15A:
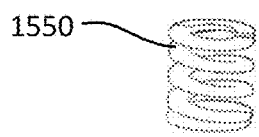
FIGS. 15A-C illustrate examples of spring elements.
Figure 15B:
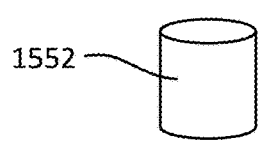
Figure 15C:
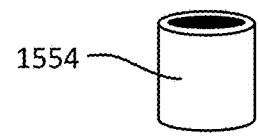

Spring elements (e.g., spring elements 1410, 1412, 1414, 1416, 1440, 1442, 1444, 1446 and 1448) may be formed in any suitable manner. FIG. 15A shows an example of a spring element 1550 that is a helical spring that is formed of a suitable material (e.g., flexible metal). FIG. 15B shows another example of a spring element 1552 that is a solid cylinder of an elastic material (e.g., rubber or rubber-like synthetic material). FIG. 15C shows another example of a spring element 1544 that is formed of a tube of an elastic material (e.g., rubber or rubber-like synthetic material). Spring elements may also be formed in other (non-cylindrical) shapes and/or of other materials. Solar panel spring elements such as spring elements 1550, 1552 and 1554 may be compressed when a spacecraft is added to a stack to provide force between a solar array and a spacecraft body.

Solar array spring elements may provide support for solar arrays and for central portions of spacecraft in a stack. Spring elements may brace a solar panel against spacecraft bodies on one or both sides. Where solar array spring elements of spacecraft in a stack brace against spacecraft bodies on both sides, this may provide a load path that may support the central portions of spacecraft.

Figure 16:
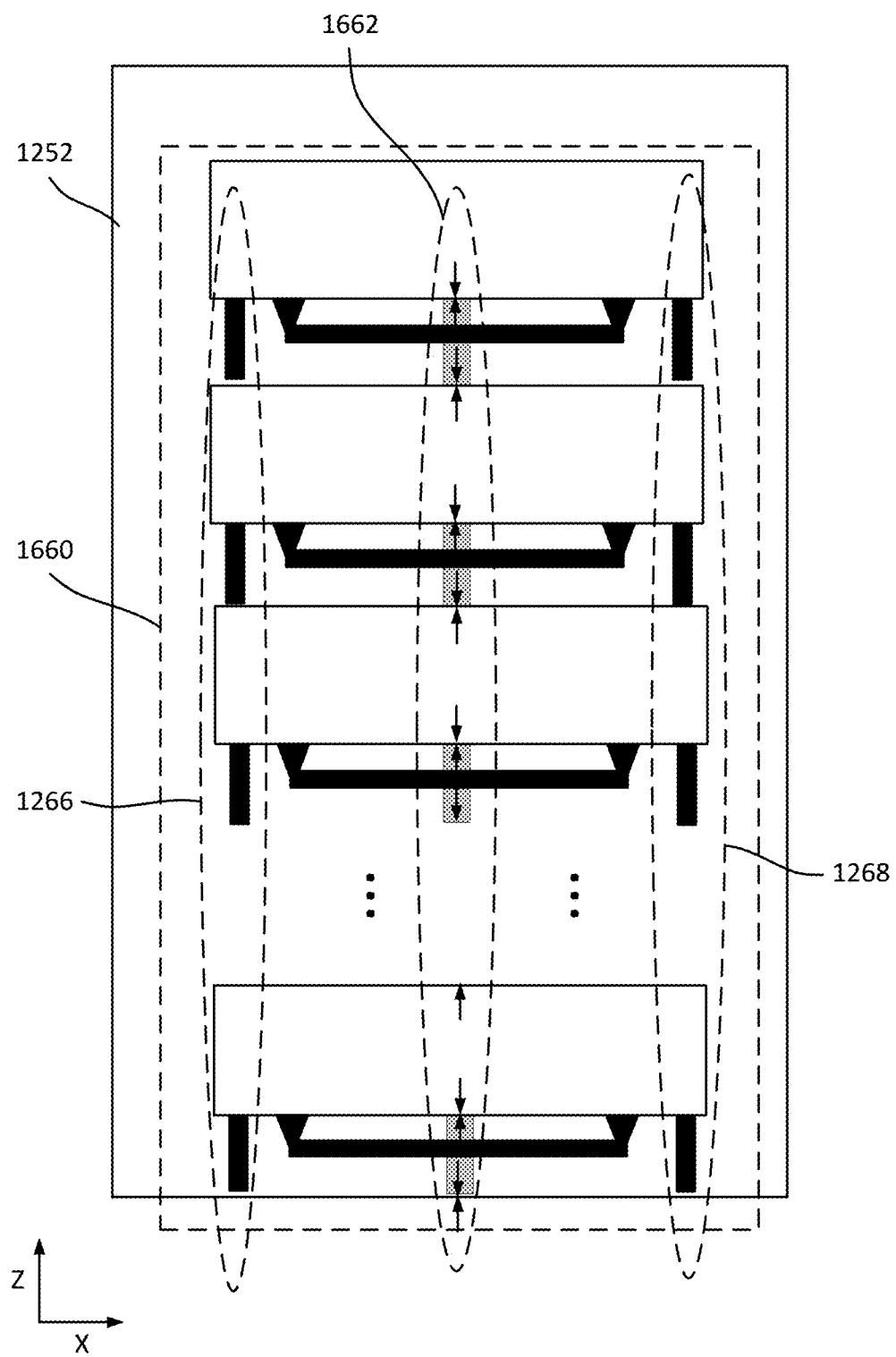
FIG. 16 illustrates an example of a load path formed by spring elements in a stack of spacecraft.

FIG. 16 shows an example of launch vehicle 1252 containing a stack of spacecraft 1660, in which each spacecraft has a solar array with spring elements. In addition to load paths 1266 and 1268 (previously shown in FIG. 12), FIG. 16 shows load path 1662 located in the central area of stack 1660 (e.g., along a central axis that extends through the central areas of spacecraft in the stack). Load path 1662 supports central areas of spacecraft in stack 1660 to reduce or eliminate bowing of spacecraft during launch and/or other unwanted effects of forces experienced during launch (e.g., spring elements may dampen any vibration of solar arrays and/or central areas of spacecraft). While spring elements are used to form a single load path 1662 in this example, multiple additional load paths may be formed in this way. In examples where a solar array has a frame structure with nodes, spring elements may be attached at any nodes (e.g., one, two, three or more nodes, up to all nodes of the solar array). A benefit of having such additional load paths that include solar arrays is that, with their involvement as a spring element within the stack, the overall loads seen by the spacecraft structure can be decreased, thus allowing a decrease in overall spacecraft mass (e.g., spacecraft components such as a spacecraft frame may be lighter because a portion of the total spacecraft stack load is borne by load paths in a central area).

Figure 17:
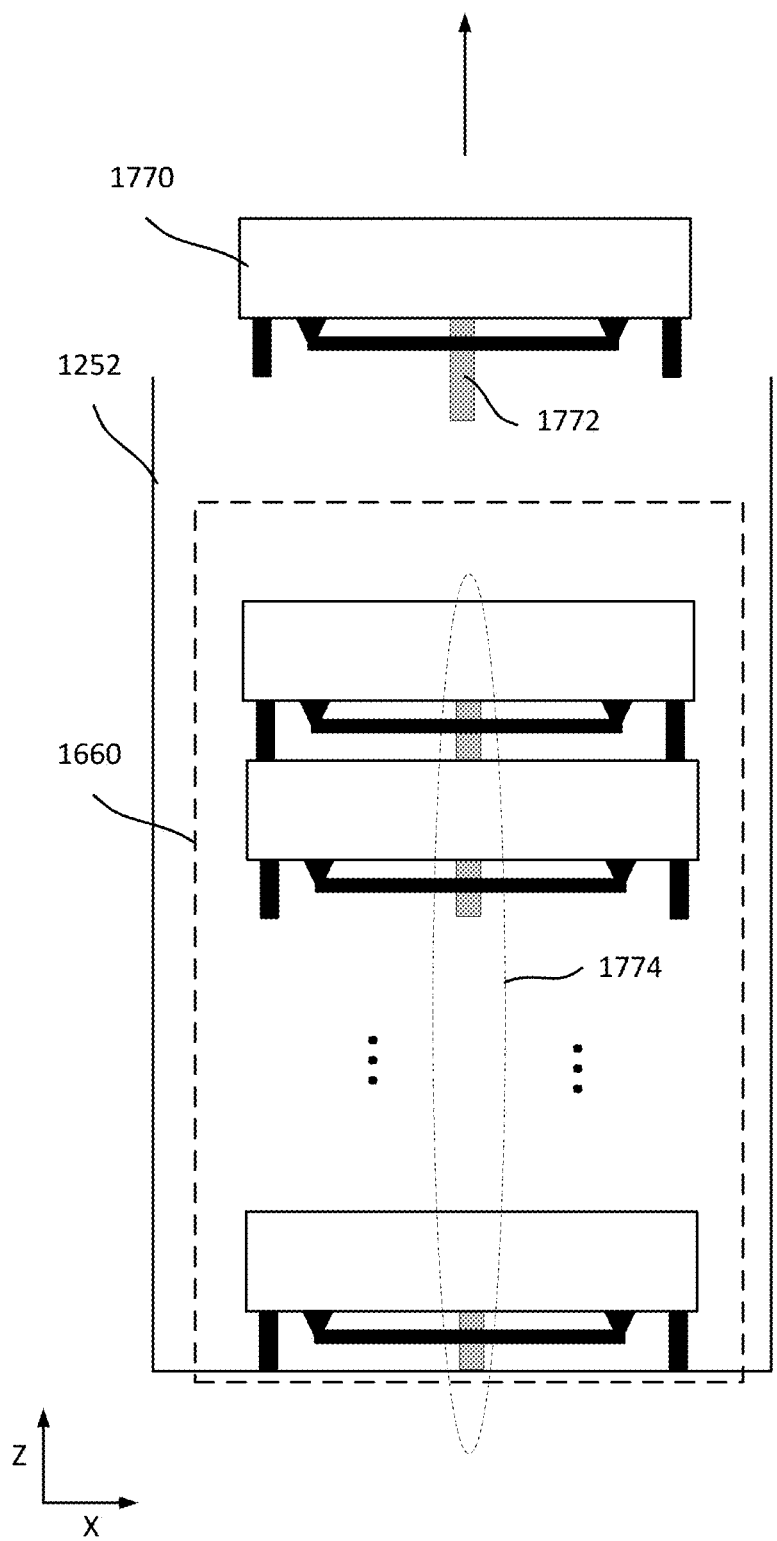
FIG. 17 illustrates an example of deployment of a spacecraft from a stack of spacecraft.

In addition to providing additional load paths and reducing vibration, spring elements may facilitate deployment of spacecraft from a stack. FIG. 17 illustrates an example of a spacecraft 1770 during deployment from stack 1660. Spacecraft 1770 moves upwards (in the positive z-direction in FIG. 17). Solar panel spring element 1772 of spacecraft 1770 facilitates this deployment by providing a force between spacecraft 1770 and the next spacecraft in stack 1660. Spring element 1772 may be in a compressed state when spacecraft 1770 is in stack 1660 and, upon release of spacecraft 1770 by a release mechanism (not shown) the force exerted by spring element 1772 causes spacecraft 1770 to move along the z-direction as spring element 1772 expands.

In some examples, all spring elements in a load path may be identical (e.g., same dimensions and spring constants) while in other examples, different spring elements may be different. As spacecraft are deployed (e.g., as illustrated in FIG. 17), the center of gravity of the launch vehicle changes so that using the identical spring elements for deployment of all spacecraft in a stack may not be optimal. In some cases, spacecraft in a stack may have solar arrays with spring elements that have different spring constants to facilitate deployment. For example, spring constants may be higher for spacecraft in a middle portion of a stack than for spacecraft above and below the middle portion of the stack (e.g., spring constants may be in an inverted-V arrangement). Spacecraft may be loaded in the launch vehicle in a manner determined by spring constants of corresponding spring elements of their solar arrays to achieve a desired configuration to enable successful deployment.

While the above examples show spring elements as dedicated components that are attached to solar panels (e.g., at nodes), in other examples, spring elements may be integrated with other components.

Figure 18A:
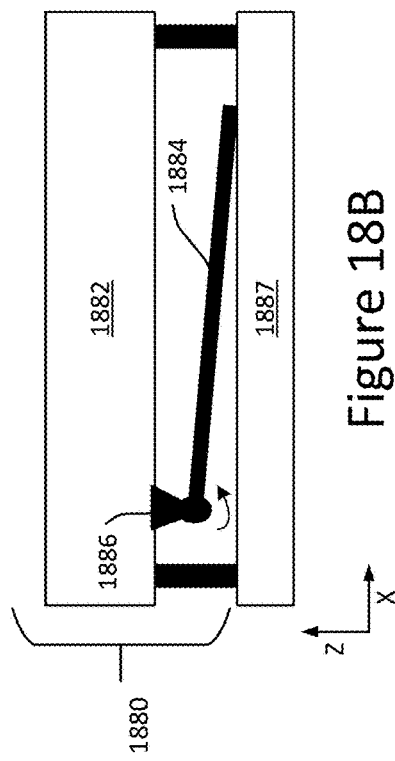
FIGS. 18A-B illustrate an example of a spring-loaded hinge as a spring element.
Figure 18B:
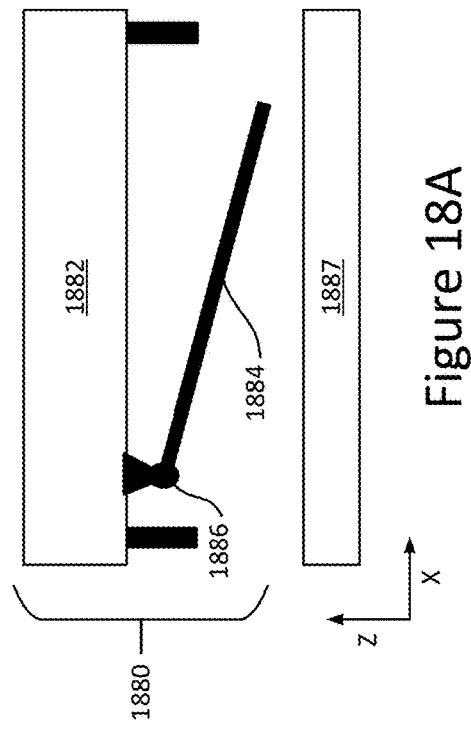

FIGS. 18A-B show an example in which a spring-loaded hinge is used as a spring element of a solar panel. FIG. 18A shows spacecraft 1880, including spacecraft body 1882 and solar array 1884, which is attached to spacecraft body 1882 by a spring-loaded hinge 1886. FIG. 18A shows spacecraft 1880 prior to being placed in a stack (e.g., prior to load bearing structures contacting neighboring spacecraft body 1887).

FIG. 18B shows spacecraft 1880 after it is placed or loaded into a stack (e.g., with load bearing structures contacting neighboring spacecraft body 1886). During loading, solar array 1884 contacts neighboring spacecraft body 1887 and as spacecraft 1880 is lowered into position in the stack, spring-loaded hinge 1886 is rotated as shown, which generates a force between solar array 1884 and neighboring spacecraft body 1887.

Figure 19A:
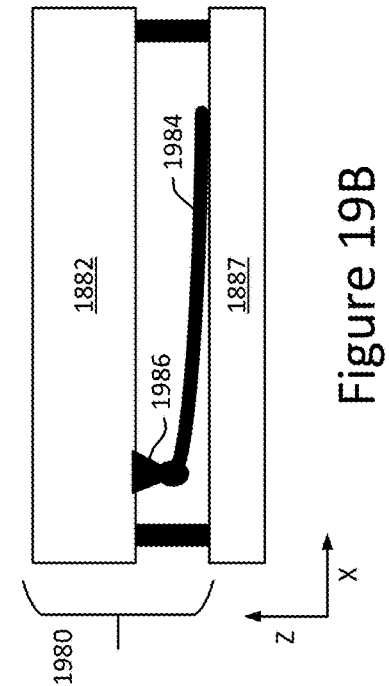
FIGS. 19A-B illustrate an example of tubes of a solar array frame used as spring elements.
Figure 19B:
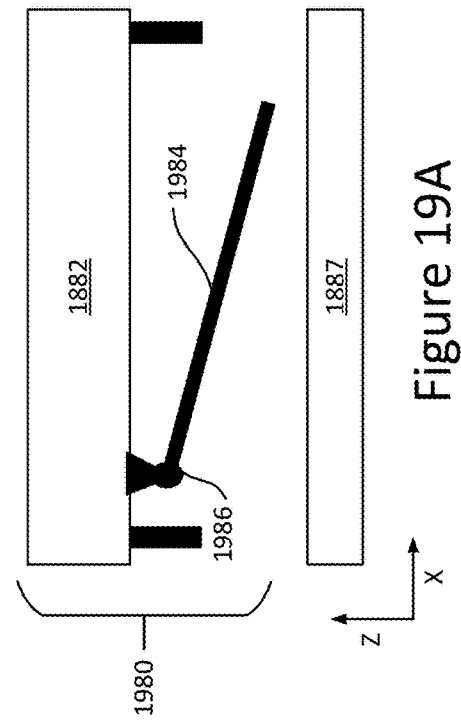

FIGS. 19A-B show an example in which one or more tubes of a solar panel frame structure (e.g., as shown in FIGS. 7-8) are used as spring elements of a solar panel. FIG. 19A shows spacecraft 1980, including spacecraft body 1882 and solar array 1984, which is attached to spacecraft body 1882 by a hinge or hold-down 1986. FIG. 19A shows spacecraft 1980 prior to being placed in a stack (e.g., prior to load bearing structures contacting neighboring spacecraft body 1887).

FIG. 19B shows spacecraft 1980 after it is placed or loaded into a stack (e.g., with load bearing structures contacting neighboring spacecraft body 1887). During loading, solar array 1984 contacts neighboring spacecraft body 1887 and as spacecraft 1980 is lowered into position in the stack, solar array 1984 deflects as shown, which generates a force between solar array 1884 and neighboring spacecraft body 1887. Hinge or hold-down 1986 may be a hinge that has a limited rotational range so that it does not rotate as spacecraft 1980 is lowered or a hold-down that holds solar array 1984 with in a fixed orientation (e.g., does not permit rotation) to ensure deflection of solar array 1984.

FIGS. 20A-B show another example in which one or more tubes of a solar panel frame structure (e.g., as shown in FIGS. 7-8) are used as solar panel spring elements. FIG. 20A shows spacecraft 2080, including spacecraft body 1882 and solar array 2084, which is attached to spacecraft body 1882 by a hinge 2086 and a hold-down 2088 (additional hinges and/or hold-downs may be provided). FIG. 20A shows spacecraft 2080 prior to being placed in a stack (e.g., prior to load bearing structures contacting neighboring spacecraft body 1886). Solar array 2084 is held by hinge 2086 and hold down 2088 such that it is bowed downwards with tubes of solar array 2084 deflected (e.g., forming a dome shape).

FIG. 20B shows spacecraft 2080 after it is placed or loaded into a stack (e.g., with load bearing structures contacting neighboring spacecraft body 1886). During loading, solar array 2084 contacts neighboring spacecraft body 1887 and as spacecraft 1980 is lowered into position in the stack, solar array 1984 deflects as shown, which generates a force between solar array 1884 and neighboring spacecraft body 1887.

While the examples of integrated spring elements shown in FIGS. 18A-20B show solar arrays contacting neighboring spacecraft bodies, in other examples, solar arrays may contact other components of neighboring spacecraft including solar arrays of neighboring spacecraft.

FIGS. 21A-B illustrate an example in which neighboring spacecraft in a stack have opposing solar arrays (e.g., each have two solar arrays as illustrated in FIG. 13 or spacecraft are arranged with alternating solar array orientations: up-down-up-down . . . ). FIG. 20A shows spacecraft 2080 prior to being placed in a stack (e.g., prior to load bearing structures contacting neighboring spacecraft 2090). Solar array 2084 is held by hinge 2086 and hold down 2088 such that it is bowed downwards with tubes of solar array 2084 deflected as in FIG. 20A. Solar array 2094 of neighboring spacecraft 2090 is similarly bowed in the opposite orientation (upwards).

FIG. 21B shows spacecraft 2080 after it is placed or loaded into a stack (e.g., with load bearing structures contacting neighboring spacecraft 2090). During loading, solar array 2084 contacts solar array 2094 of neighboring spacecraft 2090 and as spacecraft 2080 is lowered into position in the stack, solar arrays 2084 and 2094 deflect as shown, which generates a force between solar arrays 2084 and 2094 and thus between spacecraft 2080 and 2090.

Figure 22B:
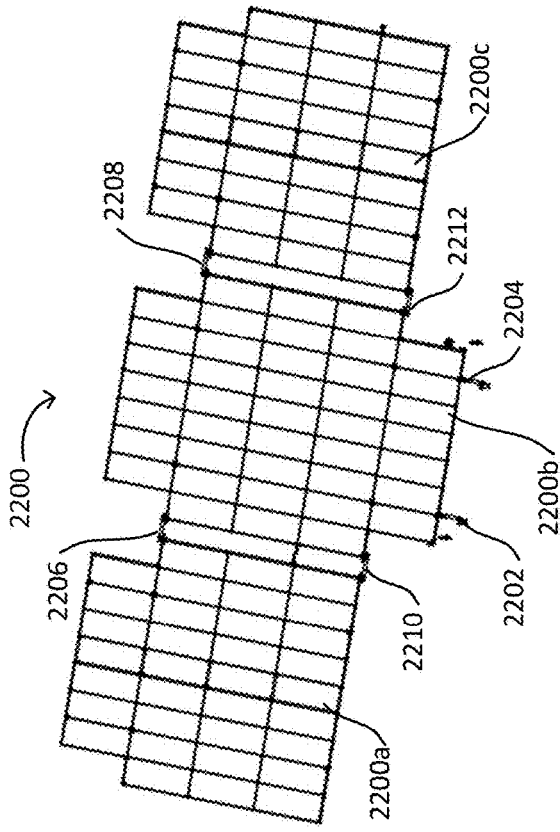
FIGS. 22A-B illustrate an example of a folding solar array made of tube and node elements.
Figure 22A:
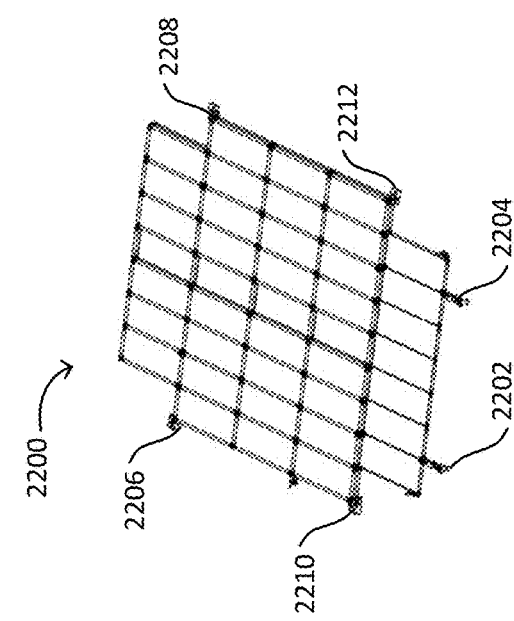

FIGS. 22A-B illustrate an example of a folding solar array 2200 that may attached to a spacecraft for stacking (e.g., in one or more of the example spacecraft above). FIG. 22A shows solar array 2200 in a folded or stowed configuration (e.g., for launch) while FIG. 22B shows solar array 2200 in an unfolded or deployed configuration (e.g., for operation in space). Solar array 2200 includes three panels (2200a, 2200b and 2200c), which overlap in the stowed configuration and extend along a common plane in the deployed configuration.

Hinges 2202, 2204 are provided to attach solar array 2200 to a spacecraft body. Hinges 2202, 2204 may be spring-loaded so that they provide force to deploy solar array 2200 from a stowed position (e.g., substantially parallel to a face of a spacecraft body) to an extended position (e.g., rotated out from the stowed position).

In addition, hinges 2206, 2208, 2210 and 2212 connect solar panels 2200a-c. Hinges 2206, 2208, 2210 and 2212 are spring-loaded and are configured to unfold solar panels 2200a-c from the stowed configuration to the deployed configuration (e.g., to rotate solar panels 2200a and 2200c from the stowed configuration in which they overlie solar panel 2200b to the deployed configuration in which they extend on either side of solar panel 2200b). Solar panels 2200a and 2200c are not as big as solar panel 2200b (do not have as many bays) so that some bays of solar panel 2200b remain uncovered when the solar panels are in the stowed configuration and can provide some power in this configuration. Solar panels 2200a-c are arranged in the stowed configuration so that nodes are aligned. Aligned nodes may provide suitable locations for locations of spring elements, hold-downs and/or other features.

Figure 23B:
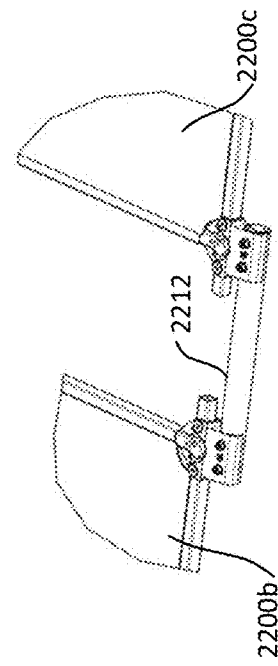
FIGS. 23A-B illustrate an example of a spring-loaded hinge connected to node elements.
Figure 23A:
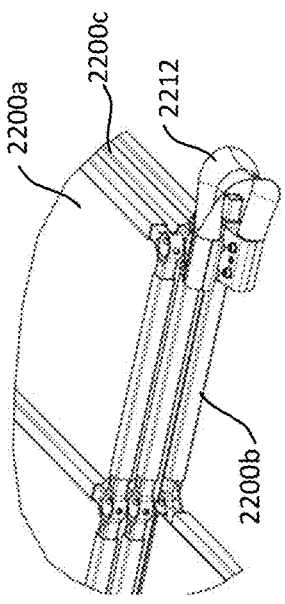

FIGS. 23A-B illustrate an example of spring-loaded hinge 2212 that connects solar panel 2200b and solar panel 2200c. FIG. 23A shows panels 2200a-c overlapping in the stowed configuration, with hinge 2212 spring-loaded (e.g., deflected from its natural or relaxed condition) so that it exerts force (e.g., rotational force or torque) on panels 2202b-c. Hinge 2212 is formed of a strip of metal that has a concave side and a convex side (concave side is facing out, to the right, in the view of FIG. 23A) and may be similar to a metal tape-measure. FIG. 23B shows hinge 2212 in the deployed configuration, extending in a straight line, to extend solar panel 2200c beside solar panel 2200b. Hinges 2206, 2208 and 2210 may operate similarly to hinge 2212 (e.g., may change from a deflected state to a relaxed state similarly to a metal tape-measure that returns to its natural state after it is deflected).

Figure 24B:
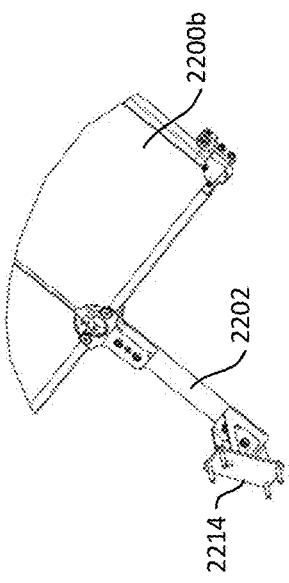
FIGS. 24A-B illustrate an example of a spring-loaded hinge.
Figure 24A:
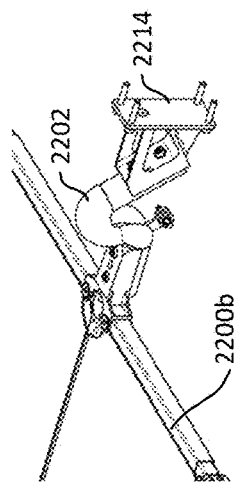

FIGS. 24A-B illustrate an example of hinge 2202 attached to solar panel 2200b. Hinge 2202 includes bracket 2214 for attachment to a spacecraft body (e.g., by screwing, bolding, riveting, or otherwise attaching). FIG. 24A shows hinge 2202 spring-loaded, so that a tape-measure-like metal strip is deflected from its natural condition and exerts a force on solar panel 2200b (e.g., rotational force or torque). FIG. 24B shows hinge 2202 in the deployed configuration, with the metal strip extending in a straight line, to extend solar panel 2200b (and solar array 2200) in a predetermined orientation with respect to a spacecraft body. The spring-loaded hinges of FIGS. 23A-24B are formed of a flexible tape and may be referred to as "lenticular hinges" or "lenticular structures." In such hinges, the spring is not a separate discrete component. A single component (e.g., metal strip) forms the hinge and the spring that spring-loads it. In other spring-loaded hinges, a spring may be a separate component. For purposes of this document, the term "spring-loaded hinge" may refer to any hinge that exerts a force (e.g., torque) when placed in an appropriate configuration (e.g., when spring-loaded) regardless of the mechanism used to generate the force (e.g., regardless of whether the spring and hinge are formed of a common component, or separate components).

Figure 25:
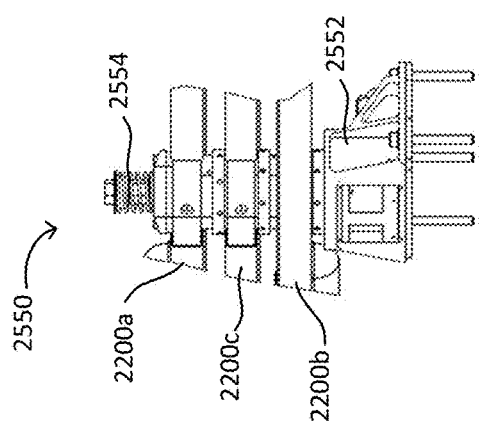
FIG. 25 illustrates an example of a hold-down.

In the stowed configuration, solar panels may be arranged with nodes of different panels aligned. This may provide strong points for attachment of hold-downs and/or springs. FIG. 25 shows an example of a hold-down 2550, which holds solar panels 2200a-c of solar array 2200 (e.g., at any node shown in FIG. 22A). Hold-down 2550 includes a central rod (not visible) that is held by a release mechanism 2552. A spring 2554 couples the rod to solar panel 2200a, which overlies solar panel 2200c, which in turn overlies solar panel 2200b. Spring 2554 applies force to hold down solar panels 2200a-c. When the central rod is released by release mechanism 2552, spring 2554 causes the rod to retract or be ejected from solar panels 2200a-c so that they are free to deploy.

Figure 26:
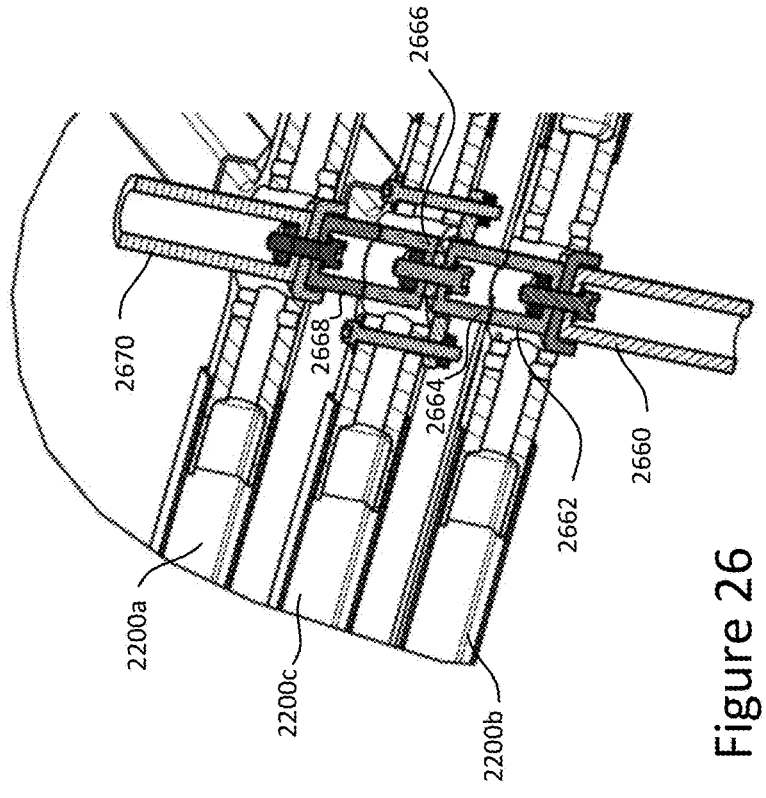
FIG. 26 illustrates an example of spring elements attached to nodes of a folding solar array frame.

FIG. 26 illustrates an example of solar array spring elements that may be used as described in any of the previous examples. FIG. 26 shows a portion of solar array 2200 in the stowed configuration, with solar panel 2200c overlying solar panel 2200b and solar panel 2200a overlying solar panel 2200c so that nodes of solar panels 2200a-c are aligned. A spring element 2660 extends down from solar panel 2200b in this view and may extend to contact a spacecraft body (or other spacecraft component) of the spacecraft that includes solar array 2200. Spring element 2660 may be compressed in the stowed configuration to provide a force between the spacecraft body and solar array 2200 (e.g., similar to spring element 1416 of FIG. 14A).

Solar panel 2200b also includes spring element 2662, which contacts spring element 2264 of solar panel 2200c. Solar panel 2200c includes spring element 2666, which contacts spring element 2668 of solar panel 2200a.

Solar panel 2200a includes spring element 2670, which extends from solar panel 2200a and may contact a neighboring spacecraft in a stack of spacecraft (e.g., similar to spring element 1412 of FIG. 14A). The combination of spring elements 2660, 2662, 2664, 2666, 2668 and 2670 form a combined spring element that may extend from one spacecraft body to a neighboring spacecraft body (or to a similar combined spring element of a neighboring spacecraft, or other component of a neighboring spacecraft). Such spring elements of solar arrays of spacecraft in a stack of spacecraft may provide a load path that provides support for solar arrays and/or spacecraft (e.g., as illustrated in FIG. 16) and may provide force for deployment of spacecraft from the stack (e.g., as illustrated in FIG. 17). Spring elements 2660, 2662, 2664, 2666, 2668 and 2670 are shown as tubular structures but may alternatively be formed of solid cylinders (or other shapes) of elastic material, helical springs (e.g., of metal) or other suitable structures. While FIG. 26 shows spring elements located at nodes of solar panels 2200a-c that are otherwise unused (e.g., no hinge or hold-down), in other examples, a spring element may be located at a node that is also used for a spring or a hinge.

Figure 27:
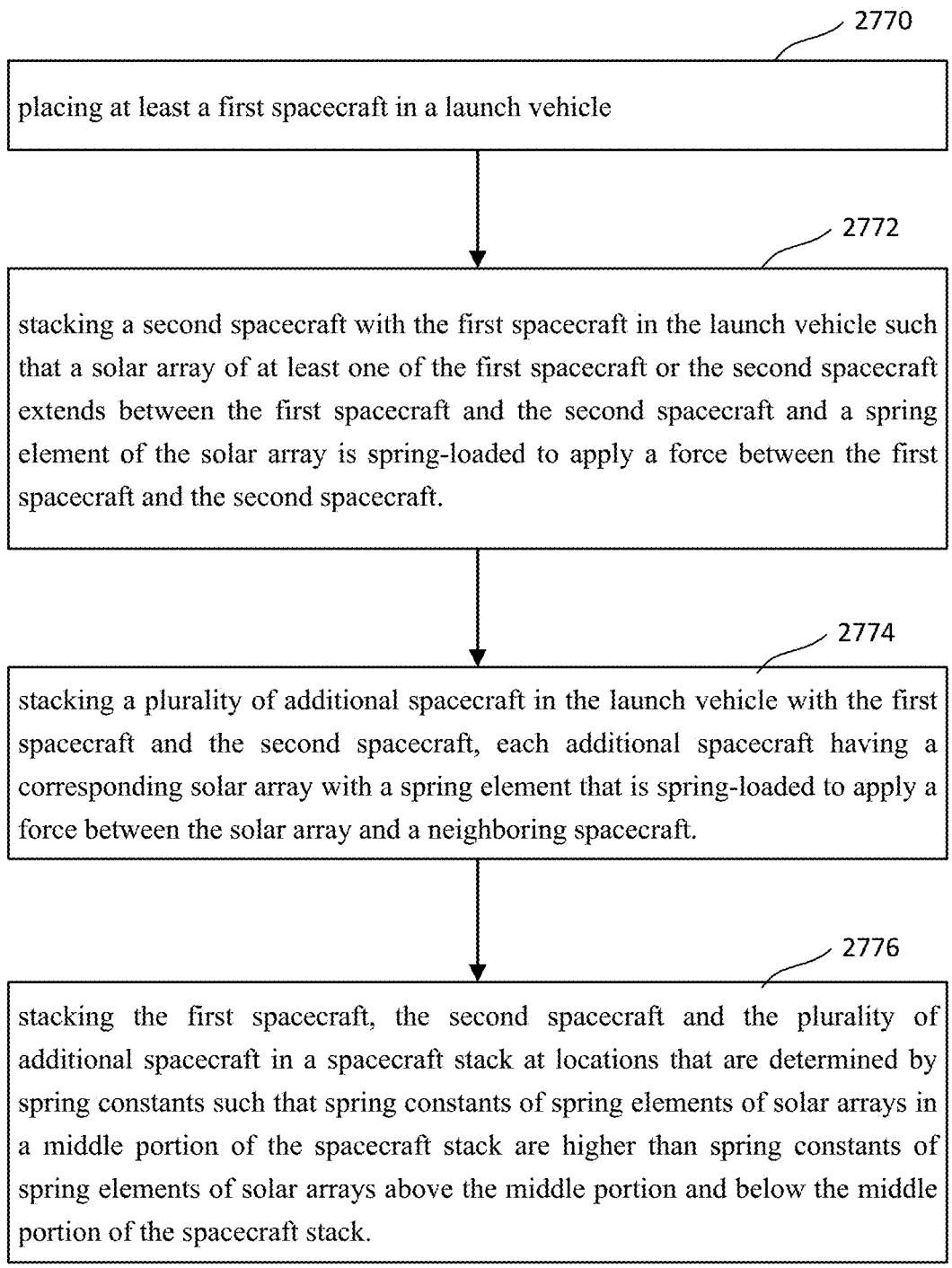
FIG. 27 illustrates an example of a method that includes stacking spacecraft with spring elements.

FIG. 27 illustrates an example of a method that may be implemented using any of the spring elements described above or otherwise. The method includes placing at least a first spacecraft in a launch vehicle 2770; and stacking a second spacecraft with the first spacecraft in the launch vehicle such that a solar array of at least one of the first spacecraft or the second spacecraft extends between the first spacecraft and the second spacecraft and a spring element of the solar array is spring-loaded to apply a force between the first spacecraft and the second spacecraft 2772 (e.g., as illustrated in the examples of FIGS. 14A-21B). The method may further include optional steps including stacking a plurality of additional spacecraft in the launch vehicle with the first spacecraft and the second spacecraft, each additional spacecraft having a corresponding solar array with a spring element that is spring-loaded to apply a force between the solar array and a neighboring spacecraft 2774 and/or stacking the first spacecraft, the second spacecraft and the plurality of additional spacecraft in a spacecraft stack at locations that are determined by spring constants such that spring constants of spring elements of solar arrays in a middle portion of the spacecraft stack are higher than spring constants of spring elements of solar arrays above the middle portion and below the middle portion of the spacecraft stack 2776.

One set of embodiments include an apparatus including a spacecraft body; a solar array attached to the spacecraft body; and a solar array spring element configured to provide a force between the solar array and one or more components of a neighboring spacecraft in a stack of spacecraft.

The solar array spring element may be configured to be placed in compression between the solar array and the neighboring spacecraft. The solar array may include a frame structure made of a plurality of tubes connected by nodes and the solar array spring element is located at a node of the solar array. The solar array may include a frame structure made of a plurality of tubes connected by nodes and the solar array spring element may be formed by one or more tubes of the plurality of tubes that are configured to be deflected against the neighboring spacecraft in the stack. The tubes may be formed of fiberglass or pultruded graphite. The solar array spring element may be a spring-loaded hinge attached to the solar array, the spring-loaded hinge may be configured to apply a torque on the solar array such that the solar array exerts a force on the neighboring spacecraft. The solar array spring element may be one of a plurality of solar array spring elements configured to provide the force between the solar array and one or more components of a neighboring spacecraft in the stack of spacecraft. A spacecraft in the stack of spacecraft may include load bearing structures in direct contact with a first neighboring spacecraft and a second neighboring spacecraft in the stack of spacecraft to provide load paths for the stack of spacecraft and the solar array spring element provides an additional load path for the stack of spacecraft. The load bearing structures may be located in peripheral areas of the spacecraft, the load paths extend through the peripheral areas and the additional load path is in a central area of the spacecraft. The apparatus may include an additional solar array attached to the spacecraft body; and an additional solar array spring element configured to provide a force between the additional solar array and one or more components of an additional neighboring spacecraft, the spacecraft body located between the neighboring spacecraft and the additional neighboring spacecraft in the stack of spacecraft.

One set of embodiments include a method that includes placing at least a first spacecraft in a launch vehicle; and stacking a second spacecraft with the first spacecraft in the launch vehicle such that a solar array of at least one of the first spacecraft or the second spacecraft extends between the first spacecraft and the second spacecraft and a spring element of the solar array is spring-loaded to apply a force between the first spacecraft and the second spacecraft.

The method may further include stacking a plurality of additional spacecraft in the launch vehicle with the first spacecraft and the second spacecraft, each additional spacecraft having a corresponding solar array with a spring element that is spring-loaded to apply a force between the solar array and a neighboring spacecraft. Spring elements of solar arrays of the first spacecraft, the second spacecraft and the plurality of additional spacecraft may have different spring constants and the method may further include stacking the first spacecraft, the second spacecraft and the plurality of additional spacecraft in a spacecraft stack at locations that are determined by spring constants such that spring constants of spring elements of solar arrays in a middle portion of the spacecraft stack are higher than spring constants of spring elements of solar arrays above the middle portion and below the middle portion of the spacecraft stack. A spacecraft stack that includes the first spacecraft, the second spacecraft and the plurality of additional spacecraft may extend along a central axis, with different spacecraft in the spacecraft stack having different rotational orientations about the central axis. The solar arrays of the first spacecraft, the second spacecraft and the plurality of additional spacecraft may each include a frame structure made of a plurality of tubes connected by nodes and the different spacecraft may have different rotational orientations such that nodes of solar arrays are aligned.

One set of embodiments includes a stack of spacecraft, each spacecraft in the stack comprising: a spacecraft body; a solar array attached to the spacecraft body, the solar array including a frame structure made of a plurality of tubes connected by nodes; and a solar array spring element located at a node of the solar array, the solar array spring element configured to provide a force between the solar array and one or more components of a neighboring spacecraft in a stack of spacecraft.

The solar array may be a folding solar array that includes a plurality of solar panels, each panel having tubes connected by nodes, nodes of each of the plurality of solar panels aligned in a stowed configuration with additional spring elements separating extending between nodes of the plurality of solar panels. Spring-loaded hinges may connect the spacecraft body to nodes of the solar array. Additional spring-loaded hinges may connect nodes of a first panel of the plurality of solar panels to nodes of a second panel of the plurality of solar panels. The solar array spring element may be formed of one of: a cylinder of elastic material, a tube of elastic material or a helical spring.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus, comprising:
   a spacecraft body;
   a solar array attached to the spacecraft body; and
   a solar array spring element that is attached to the solar array, the solar array spring element extends from the solar array and is configured to physically contact one or more components of a neighboring spacecraft in a stack of spacecraft and provide a force between the solar array and the one or more components of the neighboring spacecraft.

2. The apparatus of claim 1, wherein the solar array spring element is configured to be placed in compression in a stowed configuration.

3. The apparatus of claim 2, wherein the frame includes a plurality of frame elements formed by tubes connected by nodes.

4. The apparatus of claim 1, wherein the frame is made of a plurality of tubes connected by nodes and the solar array spring element is attached to a node and is configured to physically contact the neighboring spacecraft in the stack.

5. The apparatus of claim 4, wherein the tubes are formed of fiberglass or pultruded graphite.

6. The apparatus of claim 1, wherein the solar array spring element is a helical spring or portion of elastic material attached to the solar array.

7. The apparatus of claim 1, wherein the solar array spring element is one of a plurality of solar array spring elements configured to provide the force between the solar array and one or more components of a neighboring spacecraft in the stack of spacecraft.

8. The apparatus of claim 1, wherein a spacecraft in the stack of spacecraft includes load bearing structures in direct contact with a first neighboring spacecraft and a second neighboring spacecraft in the stack of spacecraft, the load bearing structures forming load paths for the stack of spacecraft and the solar array spring element forms an additional load path for the stack of spacecraft.

9. The apparatus of claim 8, wherein the load bearing structures are located in peripheral areas of the spacecraft, the load paths extend through the peripheral areas and the additional load path is in a central area of the spacecraft.

10. The apparatus of claim 1, further comprising:
an additional solar array attached to the spacecraft body; and
an additional solar array spring element configured to provide a force between the additional solar array and one or more components of an additional neighboring spacecraft, the spacecraft body located between the neighboring spacecraft and the additional neighboring spacecraft in the stack of spacecraft.

11. A method, comprising:
placing at least a first spacecraft in a launch vehicle;
stacking a second spacecraft with the first spacecraft in the launch vehicle such that a solar array of the first spacecraft extends between the first spacecraft and the second spacecraft, the solar array is in physical contact with the second spacecraft and a spring element that forms one or more of a spring-loaded hinge of the solar array or a frame structure element of the solar array is spring-loaded to apply a force between the first spacecraft and the second spacecraft;
subsequently, deploying the second spacecraft using the force of the spring element between the first spacecraft and the second spacecraft to separate the second spacecraft from the first spacecraft; and
using the force of the spring element to deploy the solar array from a folded configuration to an unfolded configuration.

12. The method claim 11, further comprising:
stacking a plurality of additional spacecraft in the launch vehicle with the first spacecraft and the second spacecraft, each additional spacecraft having a corresponding solar array with a spring element that is spring-loaded to apply a force between the solar array and a neighboring spacecraft.

13. The method of claim 12, wherein spring elements of solar arrays of the first spacecraft, the second spacecraft and the plurality of additional spacecraft have different spring constants, the method further comprising:
stacking the first spacecraft, the second spacecraft and the plurality of additional spacecraft in a spacecraft stack at locations that are determined by spring constants such that spring constants of spring elements of solar arrays in a middle portion of the spacecraft stack are higher than spring constants of spring elements of solar arrays above the middle portion and below the middle portion of the spacecraft stack.

14. The method of claim 12, wherein a spacecraft stack that includes the first spacecraft, the second spacecraft and the plurality of additional spacecraft extends along a central axis, with different spacecraft in the spacecraft stack having different rotational orientations about the central axis.

15. The method of claim 14, further comprising:
aligning frame structures of the solar arrays of the first spacecraft, the second spacecraft and the plurality of additional spacecraft in different rotational orientations including aligning nodes of frame structures of the solar arrays.

16. A stack of spacecraft, each spacecraft in the stack comprising:
a spacecraft body;
a solar array attached to the spacecraft body, the solar array including a frame structure made of a plurality of tubes connected by nodes; and
a solar array spring element that forms one or more of a first spring-loaded hinge of the solar array or a tube of the solar array, the solar array spring element configured to provide a force between the solar array and one or more components of a neighboring spacecraft in the stack of spacecraft.

17. The stack of spacecraft of claim 16, wherein the solar array is a folding solar array that includes a plurality of solar panels, each panel having tubes connected by nodes, nodes of each of the plurality of solar panels aligned in a stowed configuration with additional spring elements extending between nodes of the plurality of solar panels.

18. The stack of spacecraft of claim 17 further comprising second spring-loaded hinges connecting the spacecraft body to nodes of the solar array.

19. The stack of spacecraft of claim 18, further comprising additional spring-loaded hinges connecting nodes of a first panel of the plurality of solar panels to nodes of a second panel of the plurality of solar panels.

20. The stack of spacecraft of claim 16, wherein the solar array spring element is formed of a tube of fiberglass or pultruded graphite.

* * * * *